United States Patent
Cole et al.

(10) Patent No.: US 6,359,711 B1
(45) Date of Patent: Mar. 19, 2002

(54) SYSTEM AND METHOD FOR SUPPORTING A WORKER IN A DISTRIBUTED WORK ENVIRONMENT

(75) Inventors: Stephen Michael Cole; Jeffrey Alan Schanhals, both of Kentwood; George William Vallillee, IV, Grand Rapids, all of MI (US)

(73) Assignees: Steelcase Development Corporation, Caledonia; Datalogic Corporation, Grand Rapids, both of MI (US)

( * ) Notice: Subject to any disclaimer, the term of this patent is extended or adjusted under 35 U.S.C. 154(b) by 0 days.

(21) Appl. No.: 09/082,022

(22) Filed: May 20, 1998

(51) Int. Cl.[7] ............................................... H04B 10/20
(52) U.S. Cl. ...................... 359/118; 340/5.61; 359/152; 359/159; 707/1; 709/217
(58) Field of Search ................................. 359/118, 142, 359/144, 152, 159; 379/93.03; 707/1, 9, 10; 709/217, 219, 225, 226, 229; 340/5.61, 5.64, 5.2, 5.21, 5.8, 825.72

(56) References Cited

U.S. PATENT DOCUMENTS

| | | | |
|---|---|---|---|
| 3,330,955 A | 7/1967 | Barecki et al. | 359/149 |
| 3,705,986 A | 12/1972 | Sanders et al. | 359/158 |
| 4,275,385 A | 6/1981 | White | 340/825.49 |
| 4,402,090 A | 8/1983 | Gfeller et al. | 359/172 |
| 4,408,543 A | 10/1983 | Griffin | 108/24 |
| 4,426,738 A | 1/1984 | Sato | 359/147 |
| 4,450,319 A | 5/1984 | Lucey | 379/56.3 |
| 4,456,793 A | 6/1984 | Baker et al. | 379/56.3 |
| 4,516,221 A | 5/1985 | Nakata | 710/106 |

(List continued on next page.)

FOREIGN PATENT DOCUMENTS

| | | |
|---|---|---|
| DE | 3223831 | 2/1983 |
| EP | 0 192 894 | 9/1986 |
| EP | 724 227 | 7/1996 |
| GB | 2079088 | 1/1982 |
| GB | 2 296 584 | 7/1996 |

(List continued on next page.)

OTHER PUBLICATIONS

"PLX 1000" Parallax Research (printed from Internet on May 9, 1997).
"HP Creates a Simple, Reliable Way to Connect Portable PC's to a LAN" Hewlett Packard (printed from Internet on May 9, 1997).
"Wireless File Transfer Between Notebook and Desktop PCs" TekrAm (printed from Internet on May 9, 1997).
"Products Overview" Parallax Research (printed from Internet on May 9, 1997).

(List continued on next page.)

Primary Examiner—Thomas Mullen
(74) Attorney, Agent, or Firm—Foley & Lardner

(57) ABSTRACT

A distributed work environment is presented in which a plurality of mobile workers using portable computing devices can gain access to a network via network access stations installed within the work environment. Each network access station is associated with a physical location within the work environment and includes a unique station identifier that may be associated with the physical location. Upon connection to the network, the unique station identifier is provided to a location/association system on the network. Based on the unique station identifier, the location/association system may provide the worker associated with the computing device access to privileges and services associated with the physical location. The computing device may also provide to the location/association system a unique device identifier associated with the computing device and/or the worker's identity. Based on the unique device identifier, the location/association system may provide additional privileges and services in accordance with the worker's specified preferences.

43 Claims, 16 Drawing Sheets

U.S. PATENT DOCUMENTS

| | | | | |
|---|---|---|---|---|
| 4,601,064 A | 7/1986 | Shipley | ............ | 359/172 |
| 4,628,541 A | 12/1986 | Heavers | ............ | 359/142 |
| 4,649,385 A | 3/1987 | Aires et al. | ............ | 379/56.3 |
| 4,659,048 A | 4/1987 | Fahrion | ............ | 248/285.1 |
| 4,717,913 A | 1/1988 | Elger | ............ | 340/10.1 |
| 4,727,600 A | 2/1988 | Avakian | ............ | 359/172 |
| 4,807,222 A | 2/1989 | Amitay | ............ | 359/136 |
| 4,809,257 A | 2/1989 | Gantenbein et al. | ............ | 359/136 |
| 4,837,568 A | 6/1989 | Snaper | ............ | 340/10.52 |
| 4,843,606 A | 6/1989 | Bux et al. | ............ | 370/402 |
| 4,856,046 A | 8/1989 | Streck et al. | ............ | 379/56.3 |
| 4,866,704 A | 9/1989 | Bergman | ............ | 370/452 |
| 4,866,758 A | 9/1989 | Heinzelmann | ............ | 379/93.15 |
| 4,932,050 A | 6/1990 | Davidson et al. | ............ | 379/211 |
| 4,959,874 A | 9/1990 | Saruta et al. | ............ | 359/172 |
| 4,975,926 A | 12/1990 | Knapp | ............ | 375/141 |
| 4,977,618 A | 12/1990 | Allen | ............ | 359/159 |
| 5,062,151 A | 10/1991 | Shipley | ............ | 359/154 |
| 5,068,916 A | 11/1991 | Harrison et al. | ............ | 455/39 |
| 5,087,982 A | 2/1992 | Smothers | ............ | 359/137 |
| 5,099,346 A | 3/1992 | Lee et al. | ............ | 359/118 |
| 5,191,461 A | 3/1993 | Cranshaw et al. | ............ | 359/154 |
| 5,218,356 A | 6/1993 | Knapp | ............ | 342/350 |
| 5,235,258 A | 8/1993 | Schuerch | ............ | 318/16 |
| 5,241,410 A | 8/1993 | Streck et al. | ............ | 359/176 |
| 5,247,380 A | 9/1993 | Lee et al. | ............ | 359/118 |
| 5,253,095 A | 10/1993 | Menadier et al. | ............ | 359/174 |
| 5,276,680 A | 1/1994 | Messenger | ............ | 370/311 |
| 5,276,703 A | 1/1994 | Budin et al. | ............ | 375/130 |
| 5,283,819 A | 2/1994 | Glick et al. | ............ | 379/93.01 |
| 5,297,144 A | 3/1994 | Gilbert et al. | ............ | 370/346 |
| 5,305,132 A | 4/1994 | Fasen et al. | ............ | 359/113 |
| 5,307,297 A | 4/1994 | Iguchi et al. | ............ | 345/169 |
| 5,309,351 A | 5/1994 | McCain et al. | ............ | 700/3 |
| 5,321,542 A | 6/1994 | Freitas et al. | ............ | 359/172 |
| 5,363,229 A | 11/1994 | Sakurai et al. | ............ | 359/159 |
| 5,363,425 A | 11/1994 | Mufti et al. | ............ | 379/38 |
| 5,369,686 A | 11/1994 | Dutra et al. | ............ | 379/93.24 |
| 5,384,652 A | 1/1995 | Allen et al. | ............ | 359/172 |
| 5,387,993 A | 2/1995 | Heller et al. | ............ | 359/155 |
| 5,387,994 A | 2/1995 | McCormack et al. | ............ | 359/159 |
| 5,398,280 A | 3/1995 | MacConnell | ............ | 379/93.25 |
| 5,400,246 A | 3/1995 | Wilson et al. | ............ | 700/17 |
| 5,402,469 A | 3/1995 | Hopper et al. | ............ | 379/201 |
| D358,380 S | 5/1995 | Sakaguchi | ............ | D14/114 |
| 5,416,627 A | 5/1995 | Wilmoth | ............ | 359/159 |
| 5,424,859 A | 6/1995 | Uehara et al. | ............ | 359/152 |
| 5,438,937 A | 8/1995 | Ball et al. | ............ | 108/64 |
| 5,440,559 A | 8/1995 | Gaskill | ............ | 370/314 |
| RE35,035 E | 9/1995 | Shipley | ............ | 359/154 |
| 5,455,851 A | 10/1995 | Chaco et al | ............ | 379/38 |
| 5,457,742 A | 10/1995 | Vallillee et al. | ............ | 379/352 |
| 5,461,627 A | 10/1995 | Rypinski | ............ | 370/346 |
| 5,463,623 A | 10/1995 | Grimes et al. | ............ | 370/466 |
| 5,479,408 A | 12/1995 | Will | ............ | 370/313 |
| 5,493,283 A | 2/1996 | Hopper et al. | ............ | 340/5.8 |
| 5,508,836 A | 4/1996 | DeCaro et al. | ............ | 359/189 |
| 5,515,426 A | 5/1996 | Yacenda et al. | ............ | 379/201 |
| 5,526,351 A | 6/1996 | Mochinaga et al. | ............ | 370/399 |
| 5,539,665 A | 7/1996 | Lamming et al. | ............ | 709/224 |
| 5,548,637 A | 8/1996 | Heller et al. | ............ | 379/201 |
| 5,550,913 A | 8/1996 | McMaster et al. | ............ | 379/230 |
| 5,564,020 A | 10/1996 | Rossi | ............ | 359/118 |
| 5,564,070 A | 10/1996 | Want et al. | ............ | 455/507 |
| 5,566,022 A | 10/1996 | Segev | ............ | 359/172 |
| 5,568,544 A | 10/1996 | Keeler et al. | ............ | 379/273 |
| 5,596,648 A | 1/1997 | Fast | ............ | 381/77 |
| 5,600,471 A | 2/1997 | Hirohashi et al. | ............ | 359/152 |
| 5,602,843 A | 2/1997 | Gray | ............ | 370/338 |
| 5,606,444 A | 2/1997 | Johnson et al. | ............ | 359/152 |
| 5,617,236 A | 4/1997 | Wang et al. | ............ | 359/172 |
| 5,627,524 A | 5/1997 | Frederickson et al. | ............ | 340/10.2 |
| 5,631,954 A * | 5/1997 | Evans et al. | ............ | 379/201 |
| 5,633,484 A * | 5/1997 | Zancho et al. | ............ | 235/380 |
| 5,640,390 A | 6/1997 | Sakamoto et al. | ............ | 370/346 |
| 5,646,761 A | 7/1997 | Medved et al. | ............ | 359/172 |
| 5,681,008 A | 10/1997 | Kinstler | ............ | 244/3.11 |
| 5,722,076 A * | 2/1998 | Sakabe et al. | ............ | 455/450 |
| 5,742,596 A | 4/1998 | Baratz et al. | ............ | 370/356 |
| 5,751,221 A * | 5/1998 | Stanfield et al. | ............ | 340/5.74 |
| 5,809,243 A * | 9/1998 | Rostoker et al. | ............ | 709/217 |
| 5,960,085 A * | 9/1999 | De La Huerga | ............ | 380/25 |
| 6,081,356 A * | 6/2000 | Branc et al. | ............ | 359/118 |

FOREIGN PATENT DOCUMENTS

| | | |
|---|---|---|
| GB | 2 296 622 | 7/1996 |
| JP | 114639 | 7/1983 |
| JP | 7232 | 1/1985 |
| JP | 180230 | 9/1985 |
| JP | 14539 | 1/1987 |
| JP | 14540 | 1/1987 |
| JP | 87836 | 3/1990 |
| JP | 274837 | 12/1991 |

OTHER PUBLICATIONS

"VIPER IRDA Infrared Adapter for PC Motherboard" Parallax Research (printed from Internet on May 9, 1997).

"Desk Top Computing" Hewlett Packard (printed from Internet on May 9, 1997).

"ACTiSYS" (printed from Internet on May 9, 1997).

"Making Network Access Easy for Portable PC Users" Hewlett Packard (printed from Internet on May 9, 1997).

"HP Netbeamir Infrared Access Point—Product Specifications" Hewlett Packard (printed from Internet on May 9, 1997).

Proceedings of the IEEE; Nov., 1979; Gfeller et al.; Wireless In–House Data Communication Via Diffuse Infrared Radiation.

IEEE; 1978; Gfeller et al.; Infrared Communication For In–House Applications.

IBM Technical Disclosure Bulletin; Feb., 1986; Gfeller et al.; Asynchronous Communication Link For Infrared Transmission.

IBM Technical Disclosure Bulletin; Jan., 1983; Gfeller; Minicomputer System Components Interconnected Via A Serial Infrared Link.

IBM Technical Disclosure Bulletin; Feb., 1986; Touchpad Cable Function.

IBM Technical Disclosure Bulletin; Mar, 1986; Group Encoding Method for Infrared Communication.

"Wireless Infrared Connections for Portable Computer Users" JetEye Infrared Products.

"Infranet: Infrared Microbroadcasting Network for In–House Data Communication", Gfeller pp. P27–1 to P27–4.

HP Press Release; "HP to Support New 4MBPS Infrared Networking Product" (printed from Internet on May 9, 1997).

Metcalfe, Bob. Wireless Badge Nets Advance Ubiquitous Computing. Infoworld, May 25, 1992, p. 45.

* cited by examiner

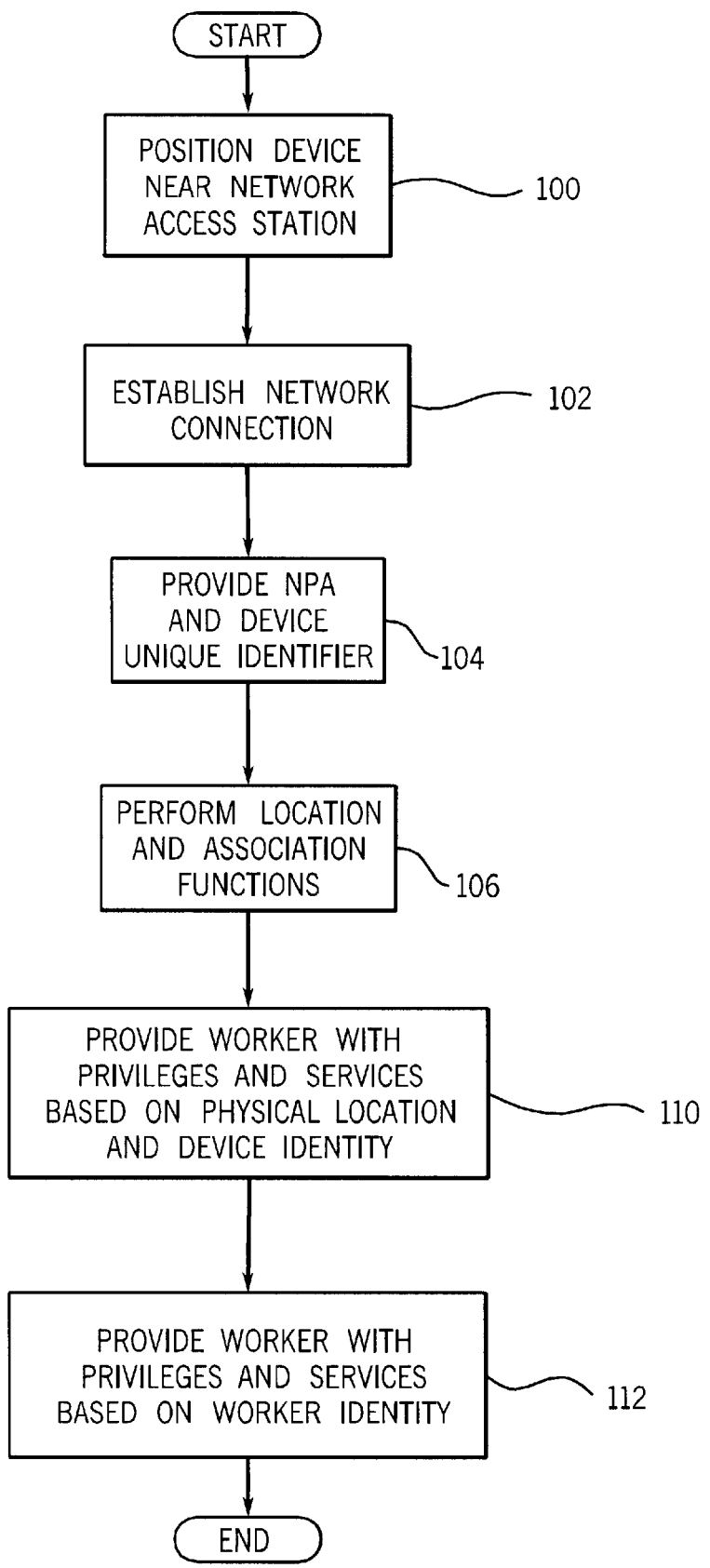

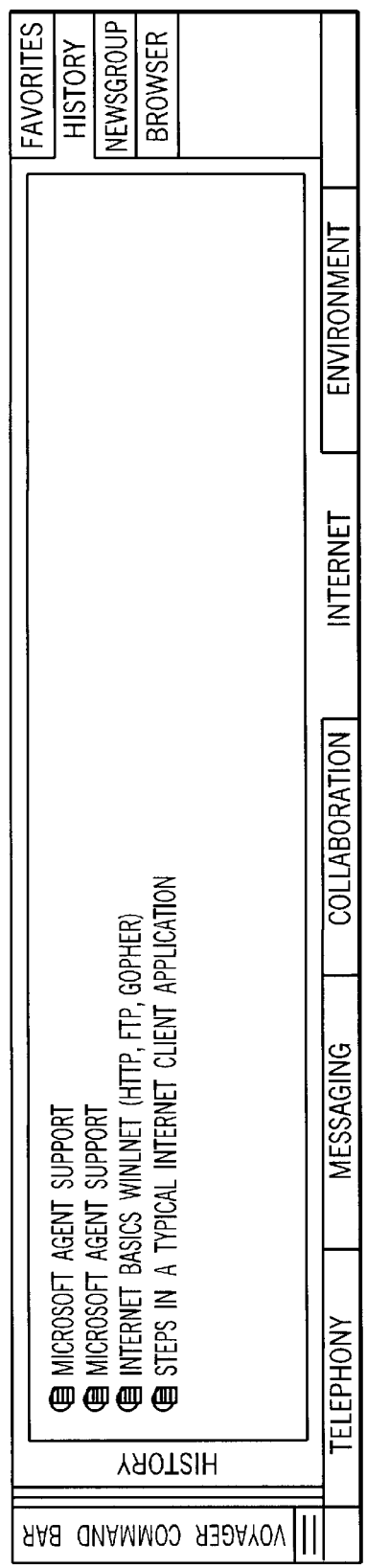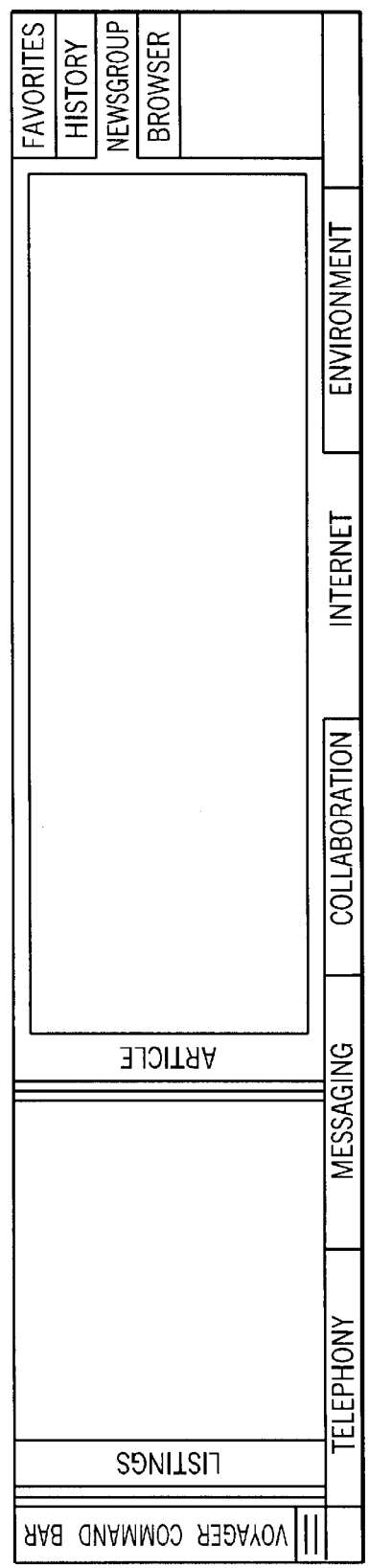

SYSTEM AND METHOD FOR SUPPORTING A WORKER IN A DISTRIBUTED WORK ENVIRONMENT

FIELD OF THE INVENTION

The present invention relates generally to a system and method for supporting a worker in a distributed work environment. In particular, the present invention relates to a system and method that identifies and locates a worker in a distributed work environment when a data communication connection is established between the worker's computing device and a network and that provides the worker with services and privileges based on the worker's location and/or identity.

BACKGROUND OF THE INVENTION

In recent years, the use of portable data communication devices has become commonplace and even necessary in the work environment. Workers must often travel from their offices and yet must retain connectivity to the workplace to access their workfiles and to respond to communications from others. Portable data communication devices, such as laptop computers, wireless telephones and pagers, facilitate travel outside of the workplace by enabling the mobile worker to maintain access to workfiles, such as via a modem or wireless link to a wired local area network (LAN), and to respond to communications from others, such as by e-mail, wireless telephone or pager.

Even within the work environment itself, workers often move about freely to attend meetings or to engage in conferences with co-workers. Yet, for a worker to retain connectivity to the workplace while moving about within the workplace, the worker must transport much of the same burdensome baggage as if he were traveling away from the workplace: a laptop computer, a pager, and perhaps even a wireless telephone, and possibly even a collection of wires and connectors. In addition, to gain access to the LAN, the internally mobile worker must find an available access port to establish a communications link, which may be difficult in conference rooms or offices where more than one user wants to connect. Thus, the worker may not be able to gain access to workfiles or presentation programs that would be useful when communicating to co-workers, or, if borrowing an access port assigned to another person, the mobile worker may not be able to access coded files or other privileges that have been tailored to the mobile worker's needs or that are available at particular areas within the work facility. Also, a worker who is often absent from his designated work space may miss important communications from others, such as phone calls, because the worker cannot be located within the work facility.

Although solutions are known which address the foregoing problems, the solutions are not complete or introduce other complications. For example, to ensure that a mobile worker receives incoming communications, one known solution includes a public address system for paging the worker. Other more sophisticated solutions include systems that locate mobile workers within the work environment through the use of a network of wireless transmitters, such as badges worn by the worker, and receivers that may be mounted in fixed locations throughout the work facility. Once the individual's location has been determined, such systems may, for example, automatically route telephone calls to the telephone nearest the individual's location. Additionally, such systems may provide the individual with certain privileges, such as access to restricted work areas or customized automatic control of the environment in particular work areas. However, it would be desirable to provide the individual with even greater freedom to move about the workplace. Such freedom would include providing customized access to the facility's LAN or other data communications network, such that the worker's office virtually accompanies the worker throughout the work facility.

The possibility of establishing a virtual office is facilitated by the widespread use of computers in the workplace, e.g. laptops and other portable or desktop computers and workstations, which allow an individual to access multiple information service applications such as e-mail, voicemail, word processing, internet access and telephony services via the work facility's LAN. More and more of these types of information applications are being accessed by individuals via their personal computers, and more and more individuals are carrying computing devices or other types of data communication devices with them, including "notebook" computers, complex calculators, daily planners, personal digital assistants, electronic address books, etc. Without the ability to access the information applications from remote locations, valuable time and resources are spent running back to the office, or relocating to a location that has a wired LAN access.

Thus, it would be desirable to provide a more elegant solution to these problems than offered by known solutions. Such a solution would allow a worker to move freely about the work facility without hindering access to wired systems. Such a solution also would be capable of locating the worker within the work facility such that communications can be automatically routed to the worker and such that the worker may enjoy certain customized privileges regardless of the worker's location or take advantage of other privileges or services available only at particular locations. Further, such a solution would provide this freedom of movement and unrestricted enjoyment of privileges without the need for installation of a costly network of transmitters and receivers which serve the sole purpose of locating mobile workers. Instead, the location feature of the solution would be integrated with the other system features. Thus, it would be advantageous to provide a system and method for supporting a worker in a distributed work environment which allows mobile access of a computing device to customized privileges and services based on the user's identification information and/or the physical location of the user.

SUMMARY OF THE INVENTION

The present invention relates to a method of supporting a worker using a computing device in a distributed work environment with a plurality of physical locations having a plurality of network access stations connected to a network so that the computing device may be connectable to the network at a network access station associated with a physical location within the work environment. The method may include positioning a communications port of the computing device near a communications transceiver of the network access station to establish a communications data link between the computing device and the network access station; establishing a network connection between the computing device and the network at the network access station to provide the computing device with a communication link to the network; registering the computing device on the network according to a network physical address associated with the network access station; determining an identity given by the worker associated with the computing device; determining the physical location of the worker associated with the computing device; providing the worker associated with the computing device with privileges and services associated with the physical location; providing the worker associated with the computing device with privileges and services associated with the identity of the worker.

The present invention also relates to a data communications system for supporting a worker using a computing device in a distributed work environment with a plurality of physical locations having a plurality of network access stations connected to a network so that the computing device is connectable to the network at a network access station associated with a physical location within the work environment. The system includes means for registering the computing device on the network according to a network physical address associated with the network access station, means for determining an identity given the worker associated with the computing device, means for determining the physical location of the worker associated with the computing device, means for providing the worker associated with the computing device with privileges and services associated with the physical location, and means for providing the worker associated with the computing device with privileges and services associated with the identity of the worker.

BRIEF DESCRIPTION OF THE DRAWINGS

The invention will hereafter be described with reference to the accompanying drawings, wherein like reference numerals denote like elements, and:

FIG. 2 is a flowchart representation of a method for supporting a worker in a distributed work environment according to a preferred embodiment of the present invention;

DETAILED DESCRIPTION OF PREFERRED AND ALTERNATIVE EMBODIMENTS

Figure 1:
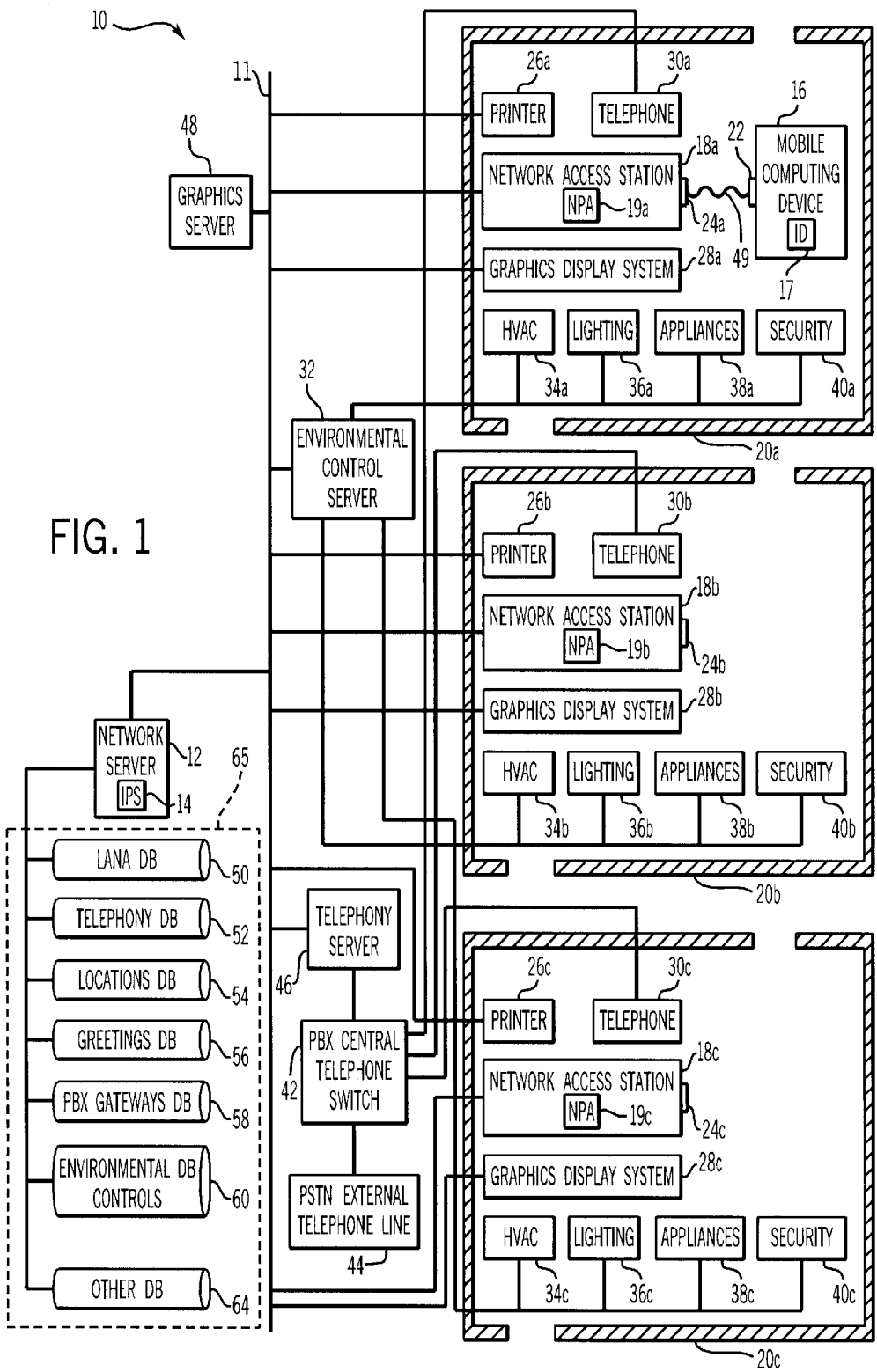
FIG. 1 is a block diagram of a system for supporting a worker in a distributed work environment according to a preferred embodiment of the present invention.

Referring to FIG. 1, there is shown a block diagram of a system for supporting a worker in a distributed work environment according to a preferred embodiment of the present invention. A distributed work environment is meant to include any work environment in which a worker who migrates between work locations within a facility may access data, application programs, electronically controlled appliances or peripheral devices, etc. based on the services and devices available at a particular location and/or the privileges accorded the worker and/or the preferences defined by the worker. The distributed work environment may be implemented by a system 10 which includes a local area network (LAN) 11 (e.g., an Ethernet LAN or other network using other protocols) that interconnects a plurality of communication nodes. LAN 11 includes one or more network servers 12 for managing communications on the network among the plurality of communication nodes to which a wide variety of computing and other communication devices may be linked.

System 10 includes an infranet positioning system (IPS) 14 which may be a software application program resident on network server 12 or which may be on a separate server in system 10, one or more portable computing devices 16, and a plurality of network access stations 18a–c which provide for a network connection between computing devices 16 and LAN 11. IPS 14, computing devices 16, and network access stations 18a–c cooperate to identify the physical location of computing device 16 based on a physical location 20a, 20b or 20c associated with the network access station 18a, 18b or 18c in communication with device 16. IPS 14 performs a variety of detection and association functions, which will be described in detail below. Physical locations 20a–c preferably are defined by walls, freestanding panels, furniture systems, etc. and may include different offices, conference rooms, or work spaces, areas or locations in a building or in a set of adjacent or remotely located buildings associated with a work facility.

Portable computing device 16 may be a portable computer such as a laptop computer, notebook computer, electronic calculator, personal digital assistant, or other electronic device having an infrared or other wireless or wired communication port 22 for communications with network access stations 18a–c. In the preferred embodiment, communication port 22 is an infrared data port that is compliant with the standards of the Infrared Data Associations[SM] (IrDA) (e.g., "Infrared Data Association Serial Infrared Link Access Protocol (IrLAP)", Version 1.0, Jun. 23, 1994, or any subsequent or related standard). Computing device 16 further includes a unique identifier 17 to identify the computing device and/or the worker associated with that computing device. For example, computing device 16 may be identified by the "device name" that is assigned to device 16 when device 16 is originally configured (e.g., by a system administrator for the LAN). The user may be identified by the user's "login name" which, for example, may be selected by the user when setting up device 16 or which may be assigned by a system administrator. Thus, the device name portion of unique identifier 17 is fixed. However, the portion of unique identifier 17 that identifies the worker may vary in situations in which more than one worker uses the particular portable computing device 16.

Network access stations 18a–c, which enable communications between computing device 16 and LAN 11, are associated with each physical location 20a–c. Stations 18a–c may be physically located at physical locations 20a–c or may be remotely located but accessible at locations 20a–c via a wired or wireless connection. Stations 18a–c include a network physical address (NPA) 19a–c, such as the unique identifier code associated with or stored on each network interface card (e.g., typically by the manufacturer), to identify the particular station 18. However, it should be understood that NPA 19 may be any type of unique tag or label than can be used to identify a particular station 18. Network access stations 18a–c may take the form of a communications card or other electronic card or may be a docking station having one or more microprocessors or other controllers for performing intelligent operations according to a control program or other program-defined routines. Stations 18a–c include communication transceivers or interfaces 24a–c for communications with computing device 16. Interfaces 24a–c may be infrared transceivers or other wireless or wired communication interfaces which implement communications according to defined standards, such as the IrDA or IEEE 802.3 standards, or other commercial protocols, such as the Ethernet protocol.

With system 10, a plurality of mobile workers (not shown) carrying portable computing devices 16 can each gain access to LAN 11 either at any of different locations 20a–c or at a single location, e.g. 20a. Upon connection to LAN 11 via a network access station 18, IPS 14 can identify the worker and/or the worker's computing device 16 based on the device's unique identifier 17 and the worker's location 20 based on the NPA 19 of the network access station 18.

System 10 may also include other communication devices or systems located at or associated with each physical location 20a–c. Such devices or systems include printers 26a–c, graphics display systems 28a–c, telephones 30a–c and various environmental systems. The environmental systems are controlled by an environmental control server 32 in communication with LAN 11 and include heating, ventilating and air conditioning (HVAC) systems 34a–c, lighting systems 36a–c, appliances 38a–c (e.g., video cassette recorders, projectors, projector screens, blinds or shades, etc.) and security systems 40a–c. Telephones 30a–c are controlled by, for example, a PBX central telephone switch 42 coupled to both a public switched telephone network (PSTN) external telephone line 44 and a telephony server 46 that is in communication with LAN 11. System 10 may also include a graphics server 48 in communication with LAN 11. System 10, however, is not dependent on the communication devices and systems enumerated above, but may include a wide variety of more or fewer devices, systems and equipment depending on the work environment needed.

According to any preferred embodiment, the environmental control server may be a controller or computing device configured to control any type of appliance, which would include (but would not be limited to) audio and/or video systems or equipment, other multimedia systems equipment, conferencing equipment, presentation equipment (e.g. white board), even consumer appliances, or the like. The type of the appliances in a particular application will, of course, depend upon the nature of the environment. However, it should be recognized that a wide variety of appliances may be supported according to alternative embodiments.

Referring now to FIG. 2, there is shown a flowchart representation of a method for supporting a worker in a distributed work environment according to a preferred embodiment of the present invention. Initially, the worker enters location 20a with computing device 16 and positions device 16 near network access station 18a (step 100). Device 16 may be placed, for example, on a work surface provided by an article of furniture such as a desk, conference table or other supporting surface. Device 16 is placed sufficiently close to station 18a so that the two may communicate, preferably via an infrared data link 49. Alternatively, computing device 16 may be physically connected to network access station 18a such that communications occur via a wired data link. In any event, once device 16 is linked either physically or electronically to station 18a, station 18a may establish a network connection to LAN 11 (step 102), either automatically or in response to instructions entered by the user into computing device 16.

Once a network connection is established, device 16 provides IPS 14 with relevant identification information (step 104) such that IPS 14 can perform its location and association functions and thus provide the worker with particular services and privileges. The terms "services" and "privileges" are intended to have their broadest meanings to include, for example, any services that are under the direct or indirect control of devices, systems or equipment associated with LAN 11 and/or rights to control such devices, systems or equipment and/or to retrieve or exchange information therefrom through application programs, interface or control routines, or in any other manner. The relevant identification information includes NPA 19 which computing device 16 retrieves from network access station 18 and provides to IPS 14. The relevant identification information further includes unique identifier 17 which, as discussed above, may include the device name and the login name of the user of device 16. Thus, computing device 16 also provides unique identifier 17 to IPS 14.

Having been provided the identification information, IPS 14 may now perform its association and location functions by referring to data stored in various databases 50–64 accessible to IPS 14 (see FIG. 1). For example, in the preferred embodiment, IPS 14 may access a database that associates each NPA 19 with a particular physical location 20 in the work facility. IPS 14 also may access a database that associates the device name portion of unique identifier 17 with a particular configuration of device 16, including available software applications. Once the physical location and the device name of computing device 16 are known, IPS 14 can provide the worker with privileges or services (e.g., call forwarding, environmental control, etc.) that are available at the particular physical location 20 and that are compatible with the configuration of device 16 (step 110). If a worker identification is also provided in unique identifier 17, IPS 14 may consult a database that associates the worker identification with more privileges or services available for that worker and individual preferences (e.g., environmental control settings, customized greetings, etc.) of the worker (step 112). The term "preferences" is meant to include any user-selectable or other type of configuration or setting for the interface, status, control, etc. of a device, system or equipment associated with LAN 11.

Figure 2A:
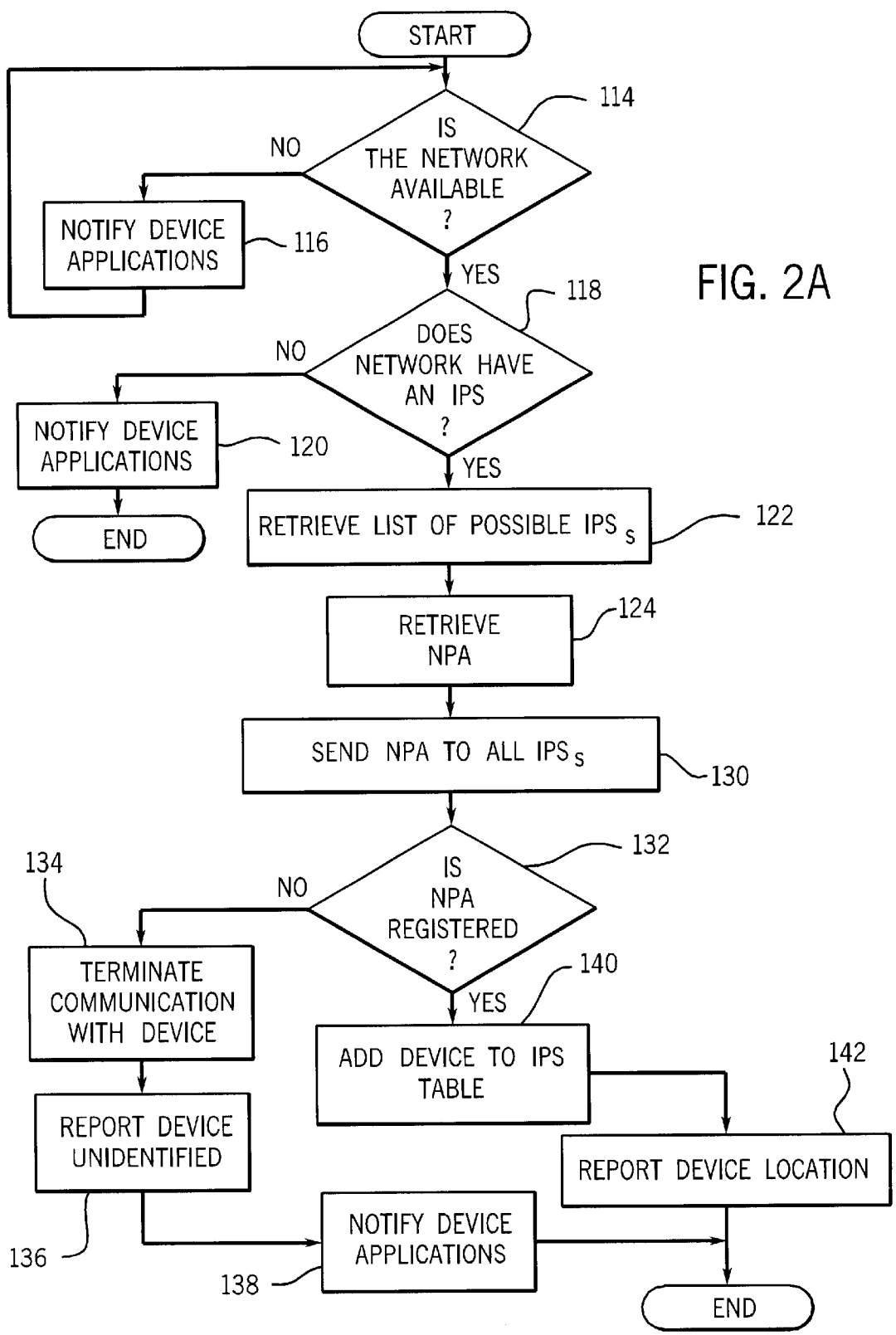
FIG. 2A is a flowchart representation of several steps of the method of FIG. 2 showing greater detail thereof.

A preferred embodiment of the above method will now be described in greater detail with respect to FIG. 2A. After device 16 is positioned near and connects with network access station 18a (step 100), a connection to LAN 11 is automatically attempted (step 114). If the network is not available, the applications on computing device 16 are notified (step 116) so that the applications can adjust their operation accordingly, e.g. by disabling certain functions that require network access, etc. Next, device 16 continues periodically checking for availability of the network (step 114). Thus, once the network becomes available, a network connection may be established.

After establishment of a network connection, computing device 16 checks if the network has one or more IPSs 14 (step 118). In one embodiment, an information location service (ILS) may exist on the network which is configured to provide a list of all available and existing IPSs. Multiple IPSs may be useful, e.g. for assigning one IPS to a "zone" of several locations 20a–c in order to reduce network traffic. If no IPS 14 exists, the applications on device 16 are notified (step 120) so that the applications can adjust their operations accordingly. In the embodiment illustrated in FIG. 2A, device 16 is incapable of performing network operations in the absence of at least one IPS 14; therefore, the routine illustrated in FIG. 2A terminates if no IPS 14 exists. In alternative embodiments, computing device 16 could operate in a "no IPS" mode in which location and association functions are not available but certain other network operations are. If one or more IPSs 14 exist, a list of the possible IPSs on the network is provided to computing device 16 (step 122).

Next, computing device 16 retrieves NPA 19 from the network access station 18 with which device 16 is in communication (step 124). As discussed above, NPA 19 may be the address of a network adapter card which is stored in the card's BIOS. In alternative embodiments, NPA 19 may be any type of unique identifier that has been assigned to network access station 18a.

NPA 19 is sent by computing device 16 to all IPSs 14 (step 130) on the network. Once an IPS 14 receives the NPA, it first determines if the NPA is one that is registered (step 132) by comparing the NPA received to a database of registered NPAs. If the NPA received is not among the list of registered NPAs, then the device having the NPA is an unauthorized device that is not allowed to communicate with IPS 14. Therefore, IPS 14 terminates communication with the device (step 134), reports to the network that the device NPA is an unidentified one (step 136), and computing device 16 notifies its applications (step 138) that it does not have access to IPS 14 so that the applications can adjust accordingly. Alternatively, IPS 14 may allow computing device 16 to register with IPS 14. In such a case, IPS 14 will request information from the user of device 16 such that available privileges and services may be associated both with the particular user and the particular device 16. Or, IPS 14 may simply provide default privileges and services.

If NPA 19 is registered, then IPS 14 adds this NPA to a table (step 140). This table is a dynamic, cross-referenced table including records for all devices 16 on the network at any given time. IPS 14 builds the table when device 16 sends its NPA 19 to IPS 14 by gathering select information from databases 50, 52, 54, 56, 58, 60, 62 and 64. IPS 14 also reports the physical location 20 back to computing device 16 and also to other communication nodes on the network that may require this information, e.g. telephone, printer and HVAC nodes at that physical location 20 (step 142).

After IPS 14 knows the identity of the worker and the physical location 20 of device 16, IPS 14 may initiate an association process by providing the worker with privileges and services associated with the worker (FIG. 2, steps 110 and 112), provided the worker has a profile stored in the database. These privileges and services are obtained preferably by reference to one or more of the databases shown in FIG. 1, or alternatively could be stored in some other type of memory for access by IPS 14. If IPS 14 is unfamiliar with the worker and the worker's preferences and privileges, these preferences and privileges may need to be entered upon first registering the worker. This can be done by automatically establishing a set of default settings, by the worker entering the settings via computing device 16, or by some combination thereof.

The databases in FIG. 1 together comprise a reconfigurable database 65 and may include a network database 50 for storing network access point information, a telephony database 52 for storing worker and physical location information regarding telephone options and preferences, a locations database 54 for maintaining a list of all possible locations 20a–c and perhaps for maintaining a list of all available services associated with each physical location, a greetings database 56 for storing a plurality of greetings that can be recalled for a selected worker at a selected location 20a–c, a PBX gateway database 58 for using computing device 16 as a telephone, an environmental controls database 60 for storing data regarding various select environmental preferences and conditions (e.g., HVAC system settings, control of projectors, screens, VCRs, blinds, shades, etc.) based on worker identifier 17 and/or location 20a–c, and one or more other databases 64 for holding other data such as other worker preferences having a series of privileges and preferences associated with the given identity of the worker. The worker may modify these preferences once a network connection is established. When a worker leaves the network and returns at a later time, these preferences may be saved for future recall.

More or fewer of the above databases may be part of reconfigurable database 65 in various other embodiments of the present invention. All of the above database information can be recalled by cross-referencing the information with the worker's identity, the identity of the worker's computing device, and/or the physical location of the worker.

The system and method of the present invention thus provide countless features and functions available to support a worker in a distributed work environment. For example, a worker may have telephone calls routed to a selected telephone set at a remote location, or directly to the worker's device at that location. Additionally, network communications, including electronic mail, peripheral device connections, application programs and database access for the worker may all be accessed from remote locations once a network connection is established with IPS 14. The worker may also be provided with the ability to control environmental systems including lighting, HVAC, appliance and security settings based on both individual preference and work location. The IPS continuously updates the databases to maintain the privileges and services associated with each physical location for each individual worker. In addition, the worker may be apprised of, e.g. the nearest telephone, printer, graphics display or other network service as well as its physical location within the work environment. Further, a telephone call intended for a worker may be routed directly from a central telephone network to the actual location of the worker and received either at a telephone at the worker's location, or through the worker's computing device 16.

Figure 3:
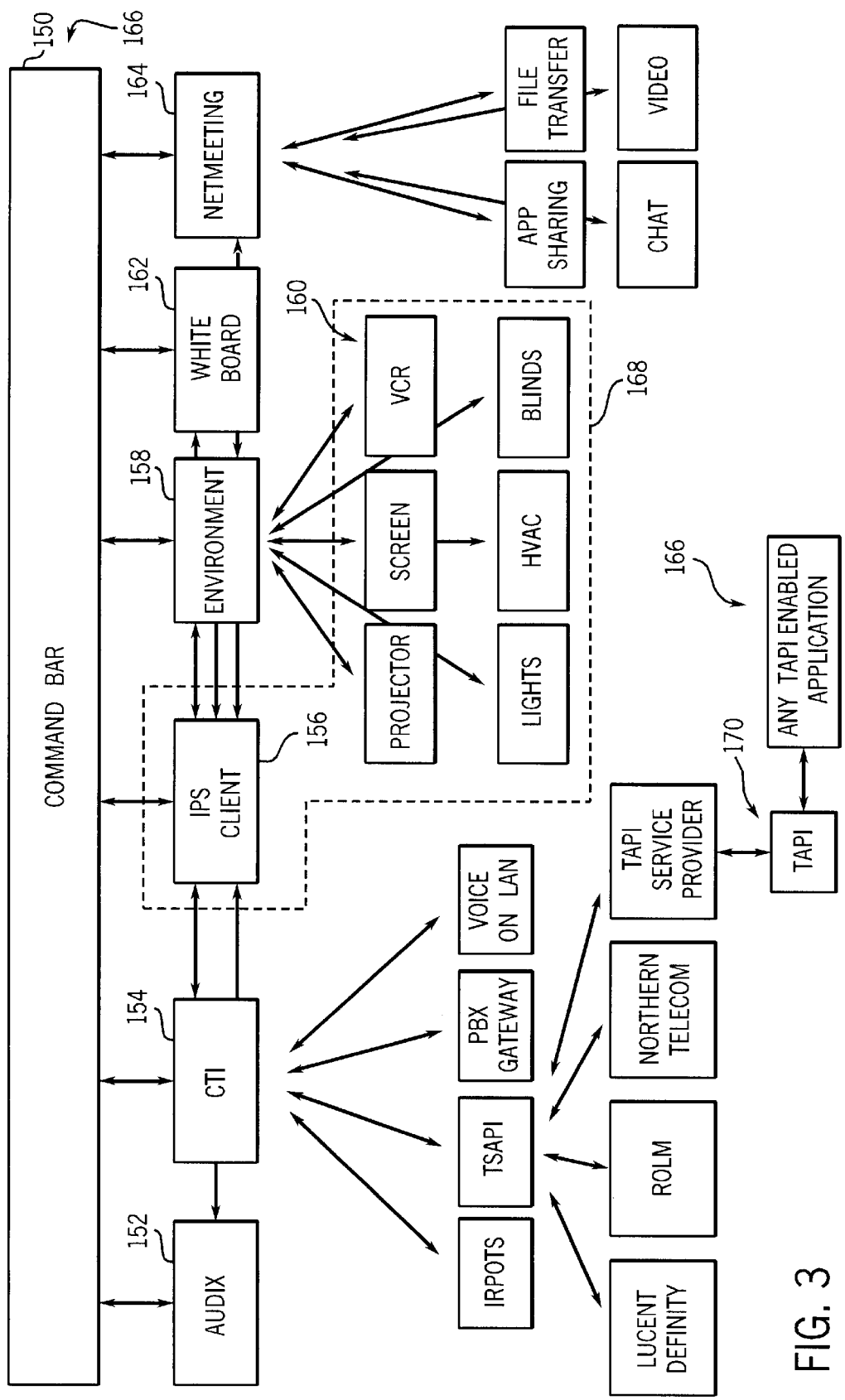
FIG. 3 is a chart indicating exemplary applications operable via a portable computing device as part of the system depicted in FIG. 1.

FIG. 3 is a chart indicating exemplary applications operable via a user interface (e.g., a command bar) accessible at a portable computing device as part of the system depicted in FIG. 1. When the worker has established a network connection and provided the relevant identification information to IPS 14, the worker operates through a series of "pull-down" menus (see, e.g. FIG. 4A) to select from the multitude of information, voice, video and communications services and privileges that may be accessed from the remote location. The worker enters commands and receives data through a command bar 150. Through command bar 150, a voice messaging object 152, e.g. AUDIX, may be accessed to retrieve, send, forward and save voicemail messages. Telephony services may also be accessed via a telephony object 154, e.g. CTI (computer telephony integration) system. According to the exemplary embodiment indicated in FIG. 3, CTI system 154 provides an interface for, among other systems and applications, any conventional telephony and telephony server systems, for example, a TSAPI-compliant telephony system (e.g. a central telephone switch/PBX of a type available from Lucent, Rolm, Northern Telecom, or any other suitable supplier, accessed through an interface shown as a PBX Gateway, with a compatible telephony server accessed through a suitable interface, or TSAPI) and/or a TAPI-compliant service provider (which may be connected through a suitable interface 170 to a TAPI-enabled application or system 166). CTI system 154 may also be connected to a multimedia data communication system, shown in FIG. 3 as a "Voice on LAN" or system configured for a telephony-based application. Such TSAPI-compliant and TAPI-enabled systems will facilitate full-featured telephony at the computing device. (According to any particularly preferred embodiment, such systems could be implemented through one or more software programs installed on or with hardware systems or devices.) Other IPS clients 156 may be accessed via command bar 150. Various environmental controls 160 (e.g. any type of "intelligent appliance" or like device, including but not limited to those devices shown in FIG. 3) may be accessed via command bar 150 through an environment object 158. Command bar 150 further includes access to a white board 162 (e.g., a recordable presentation device) and various interfacing objects via "Netmeeting" object 164 (e.g., an application program allowing on-line communication by two or more persons who virtually attend a netmeeting via their respective computing devices). FIG. 3 also indicates where each of the objects and/or applications resides (e.g., Windows applications 166, objects local to the device 168, Windows API communication 170, etc.).

Figure 4A:
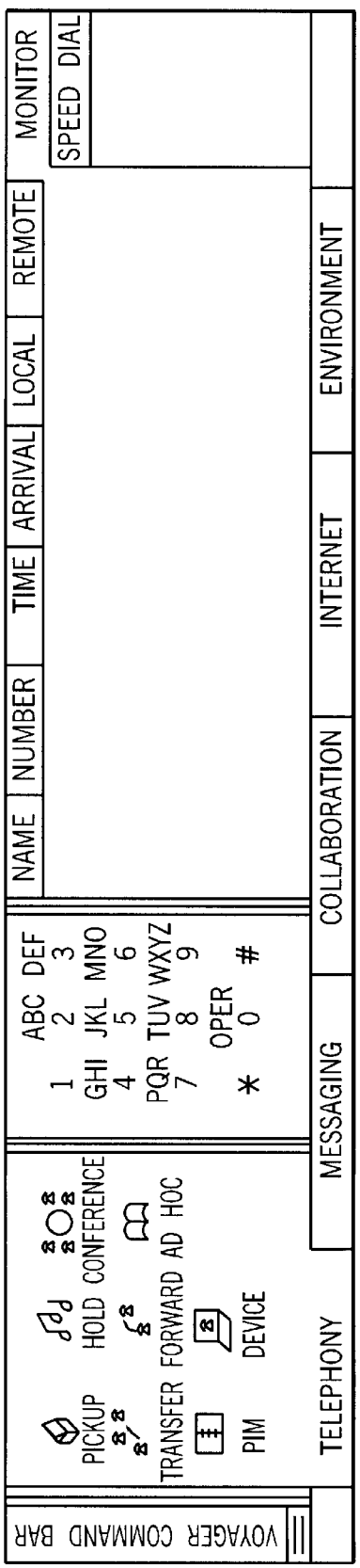
FIGS. 4A–4X are user interface screens for interface with a worker via a portable computing device according to an exemplary embodiment of the present invention.
Figure 4B:
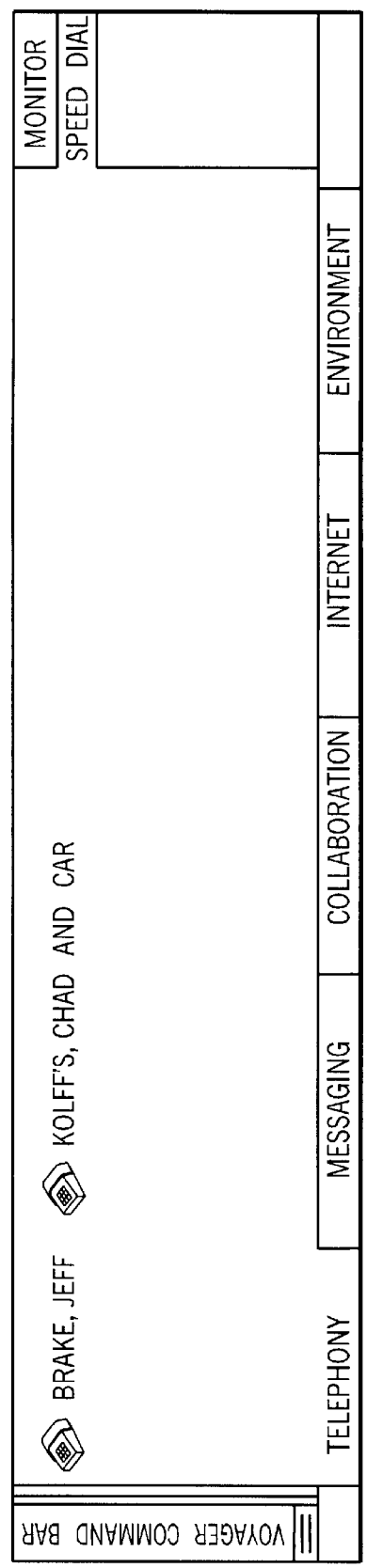
Figure 4C:
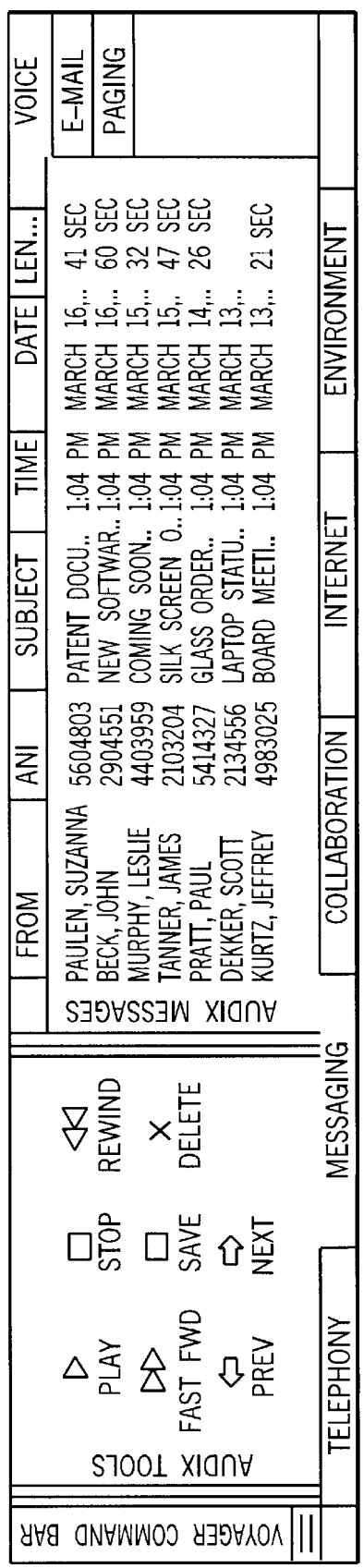
Figure 4D:
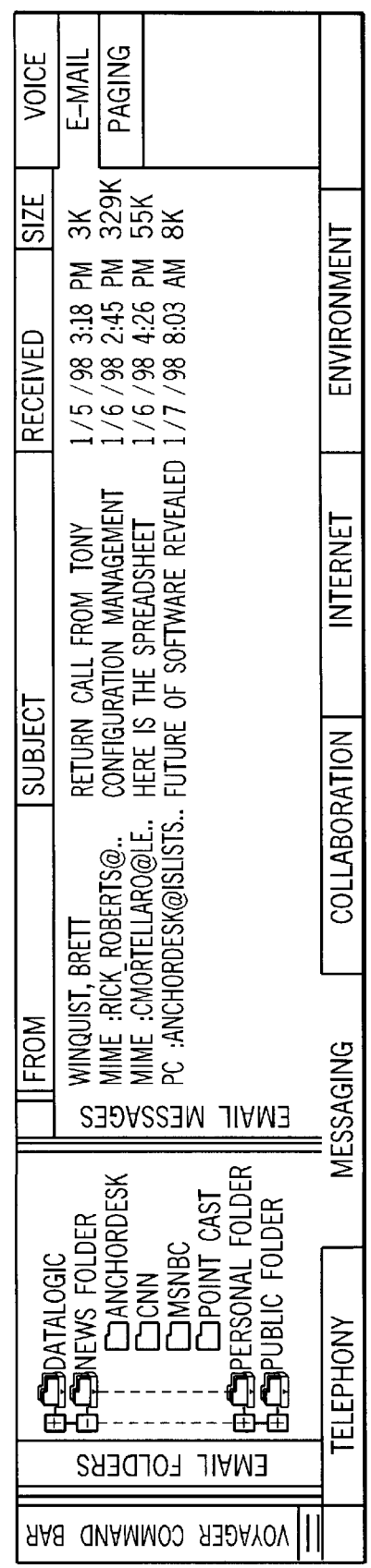
Figure 4E:
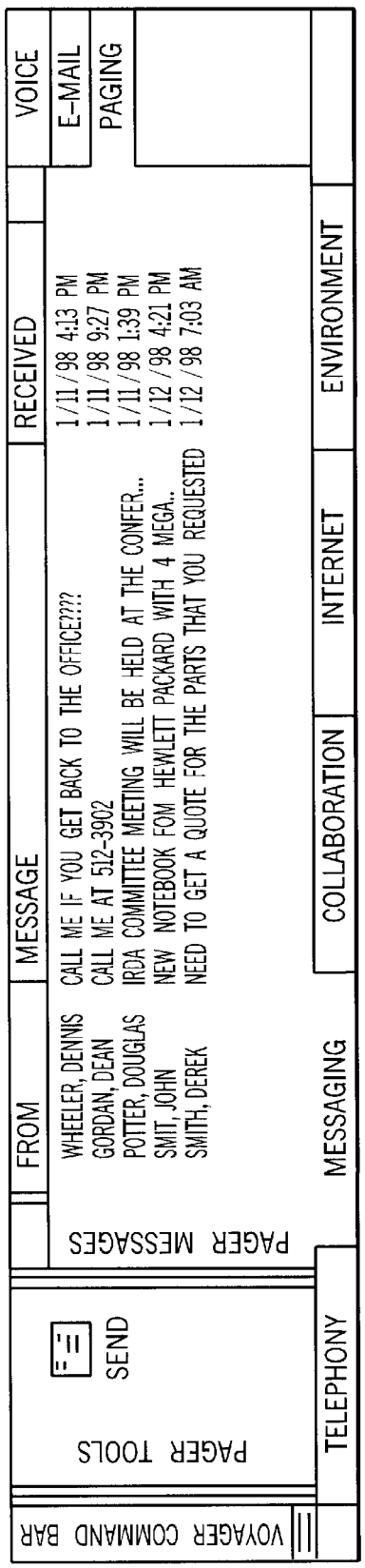
Figure 4F:
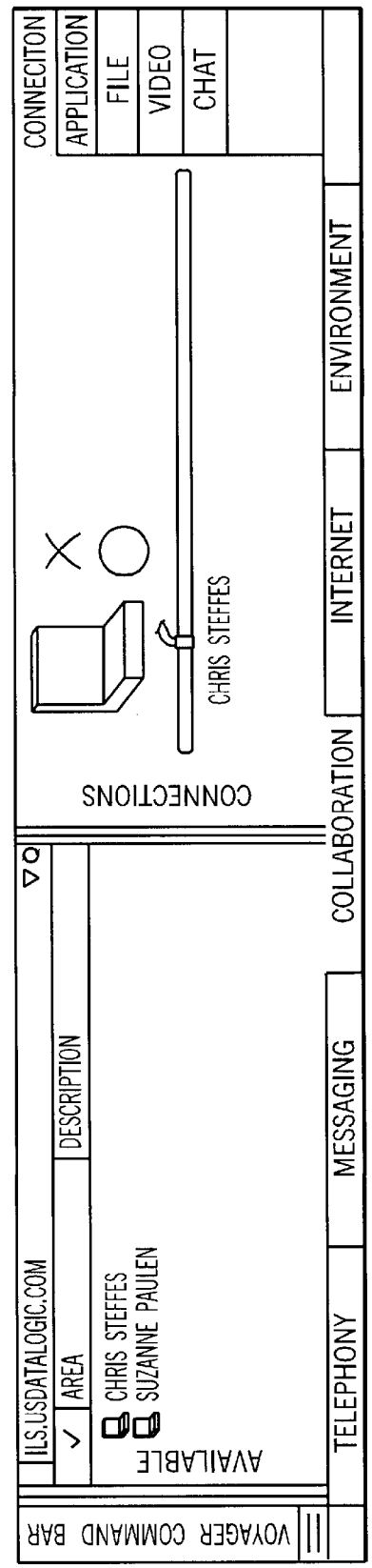
Figure 4G:
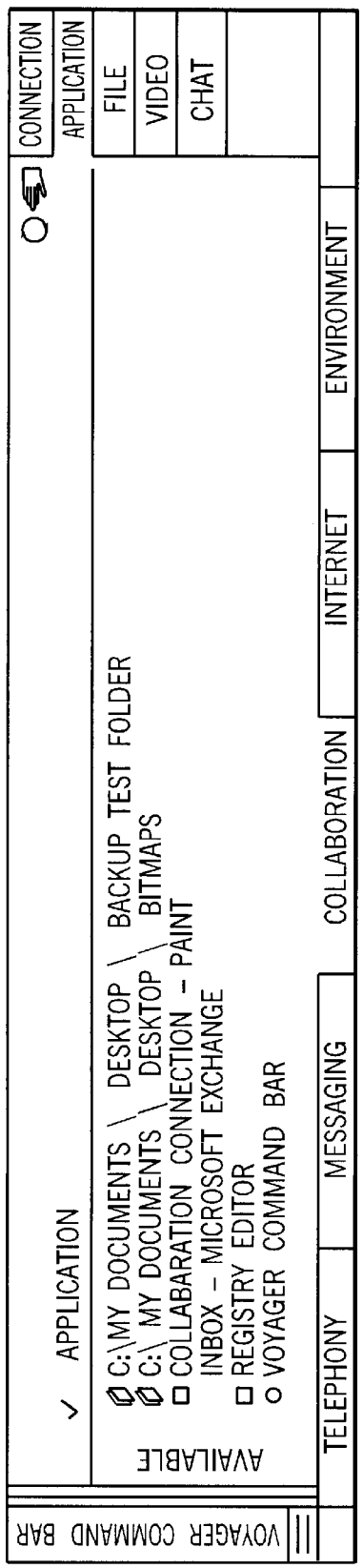
Figure 4H:
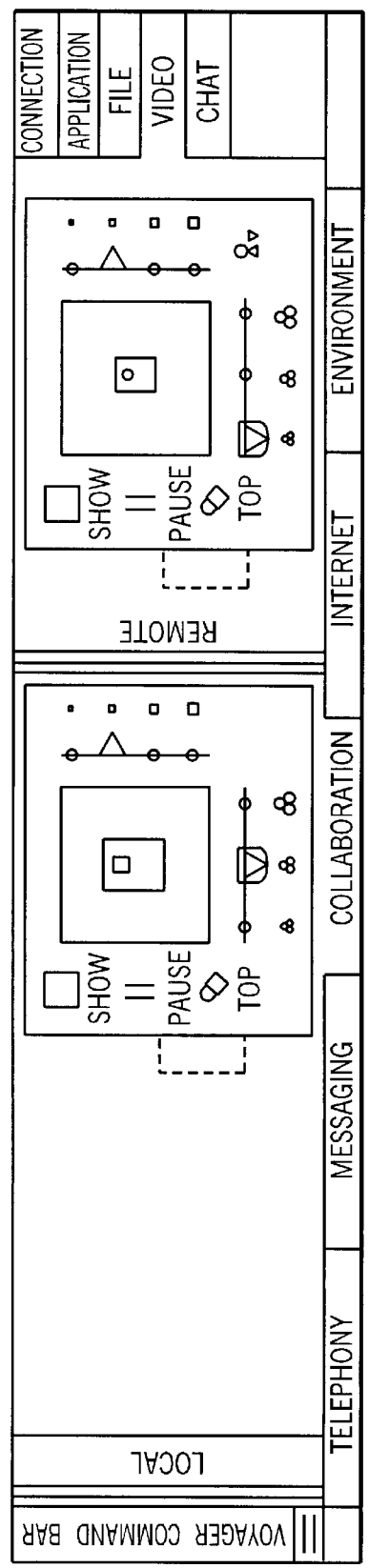
Figure 4I:
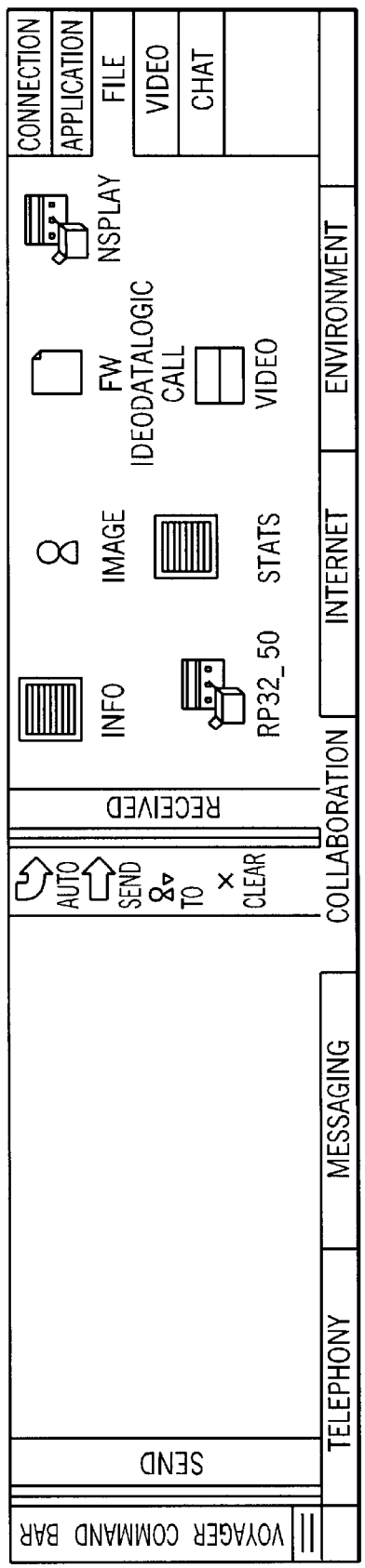
Figure 4J:
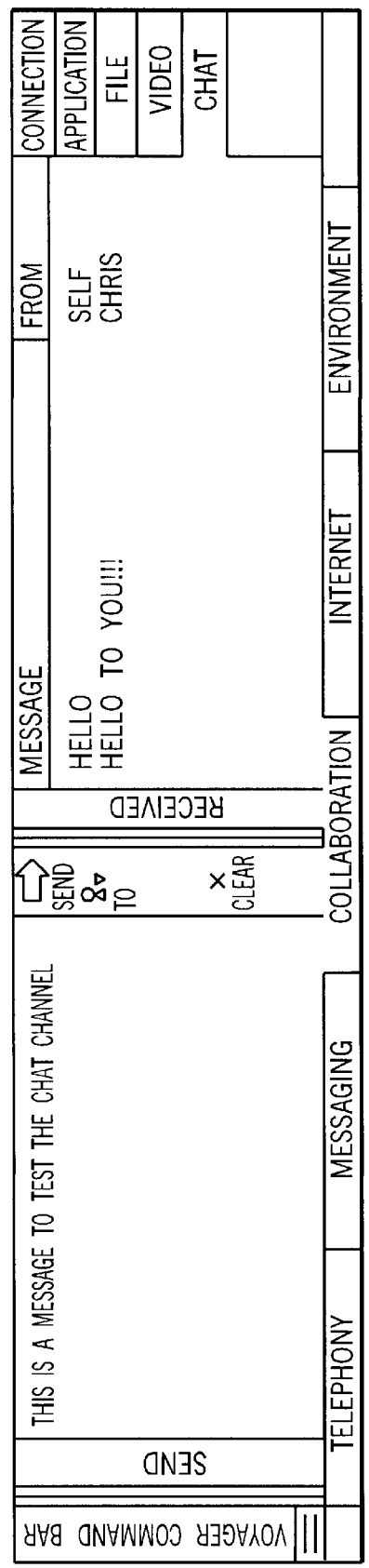
Figure 4K:
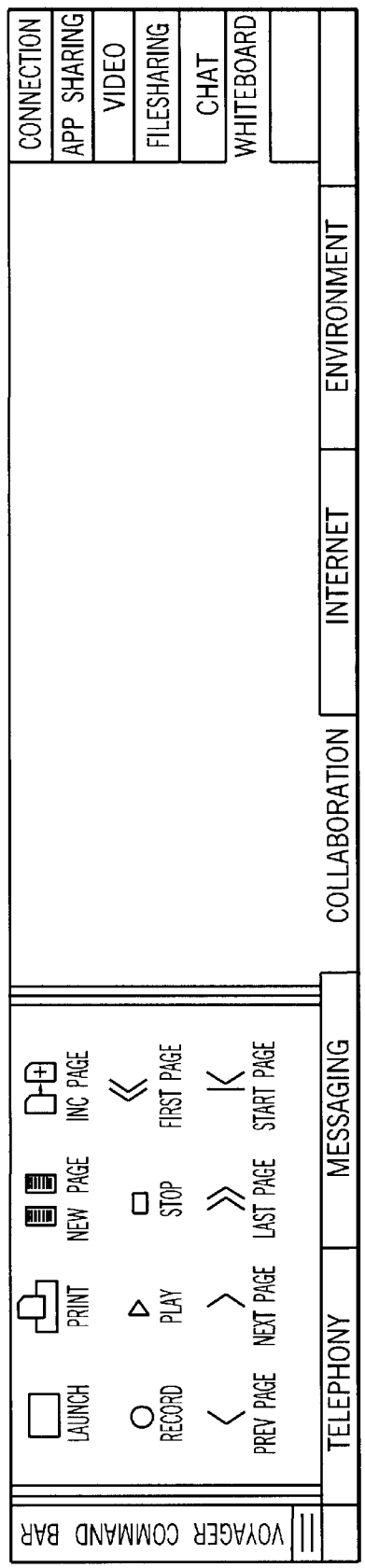
Figure 4L:
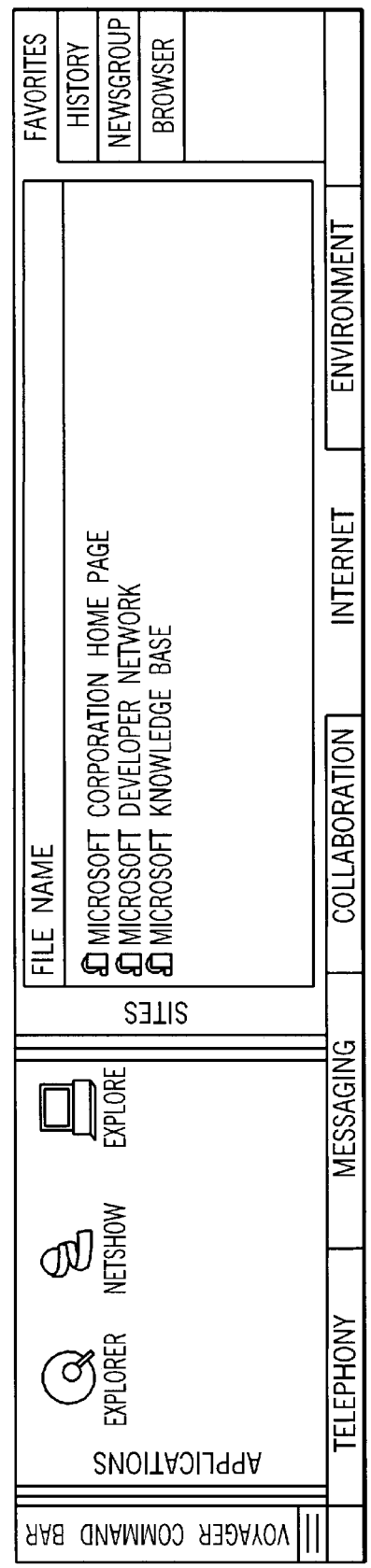
Figure 4O:
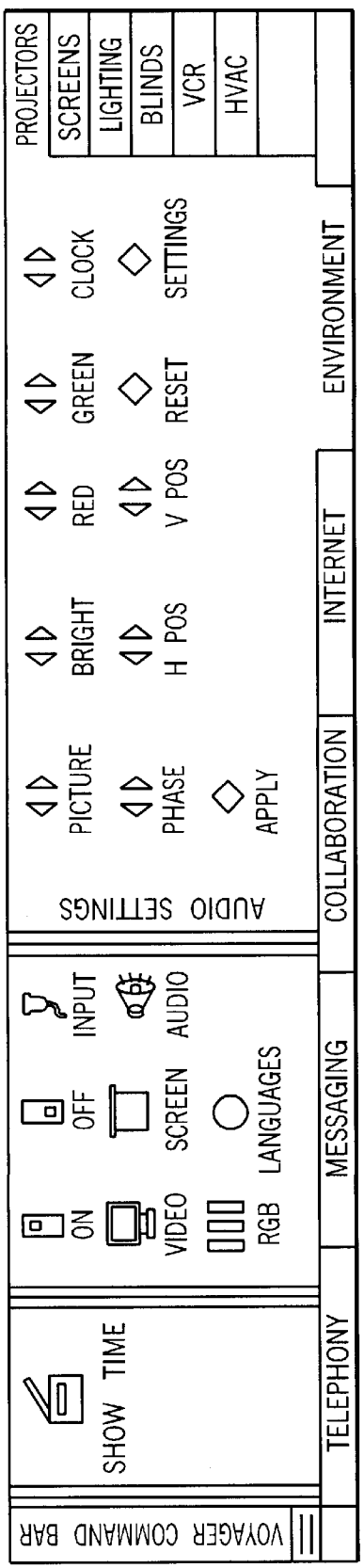
Figure 4P:
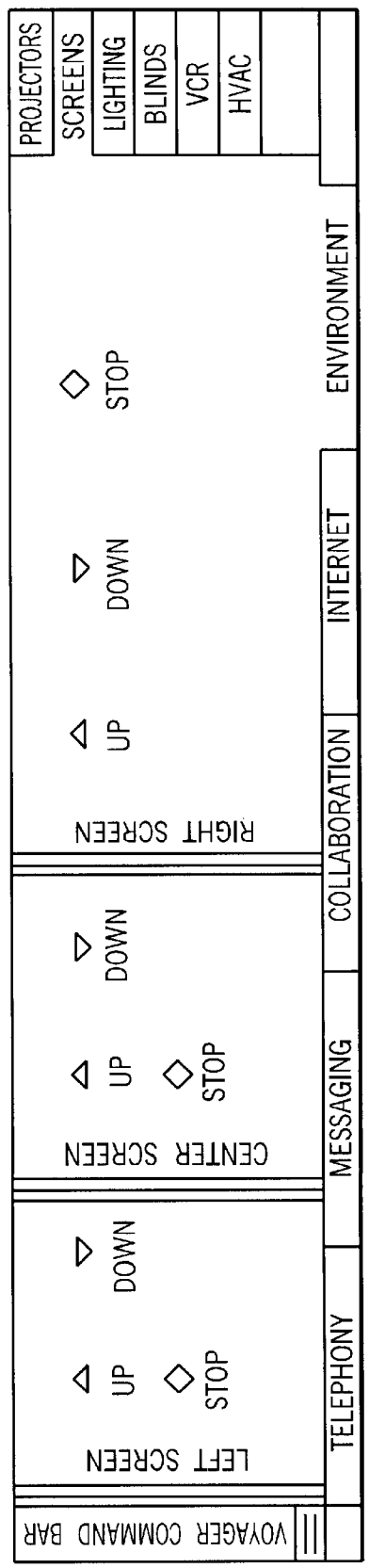
Figure 4Q:
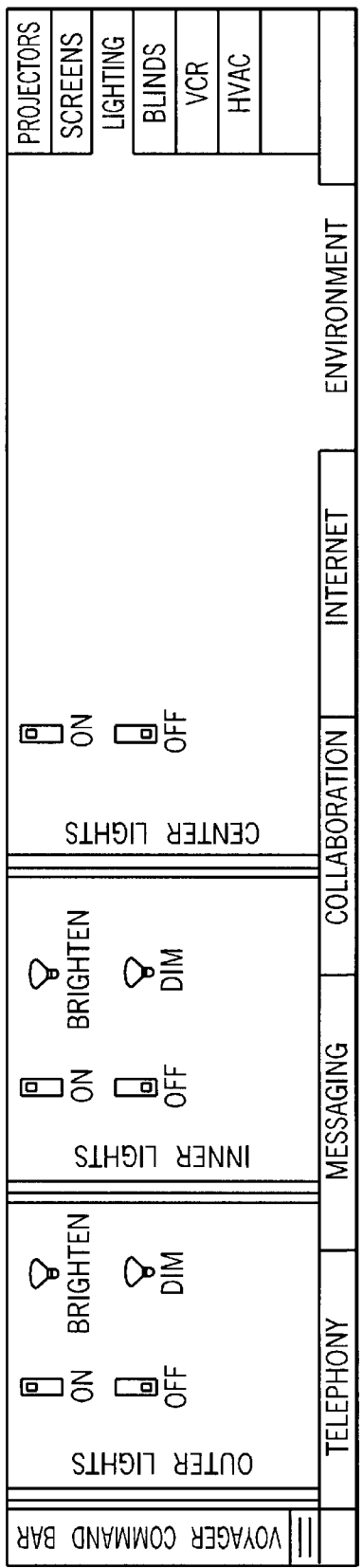
Figure 4R:
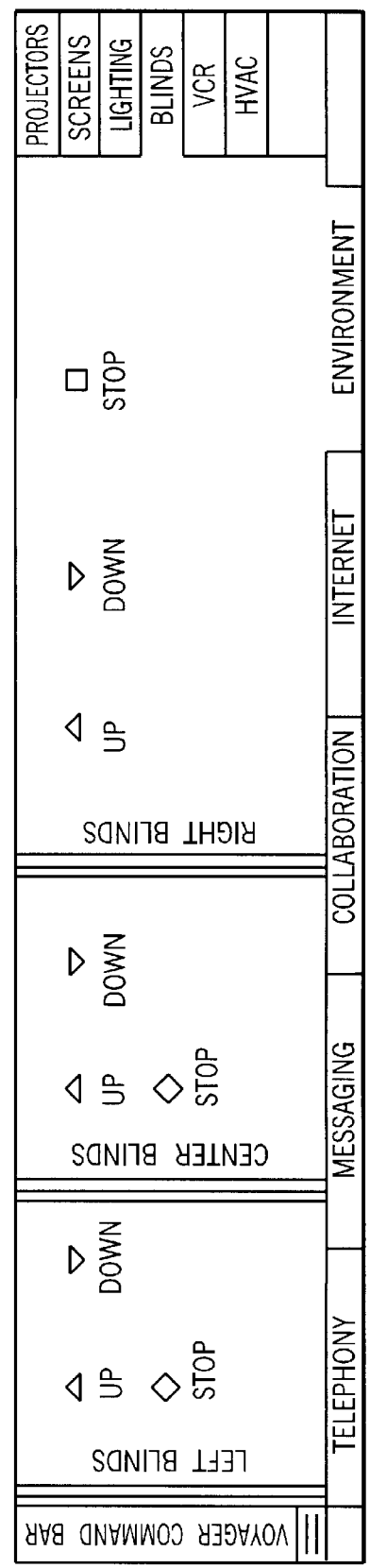
Figure 4S:
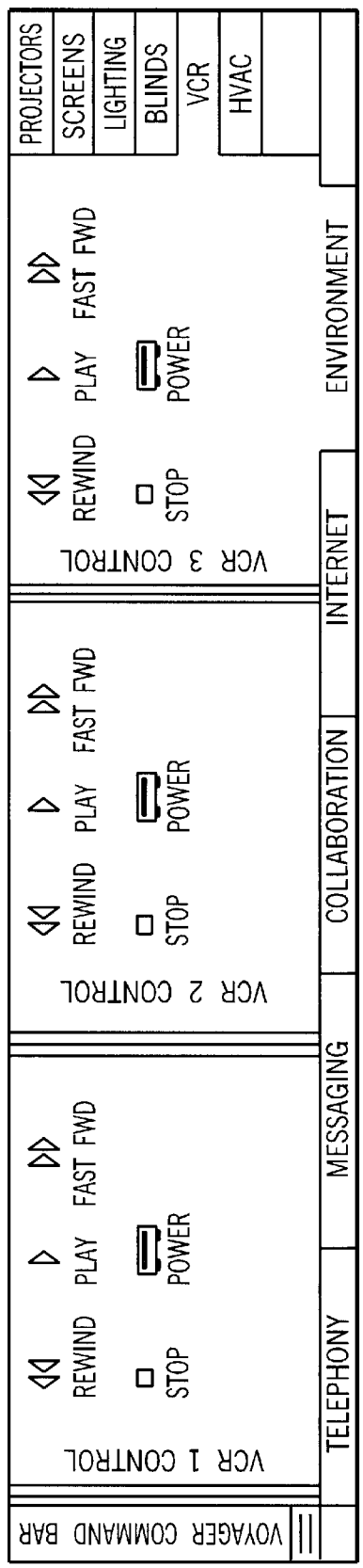
Figure 4T:
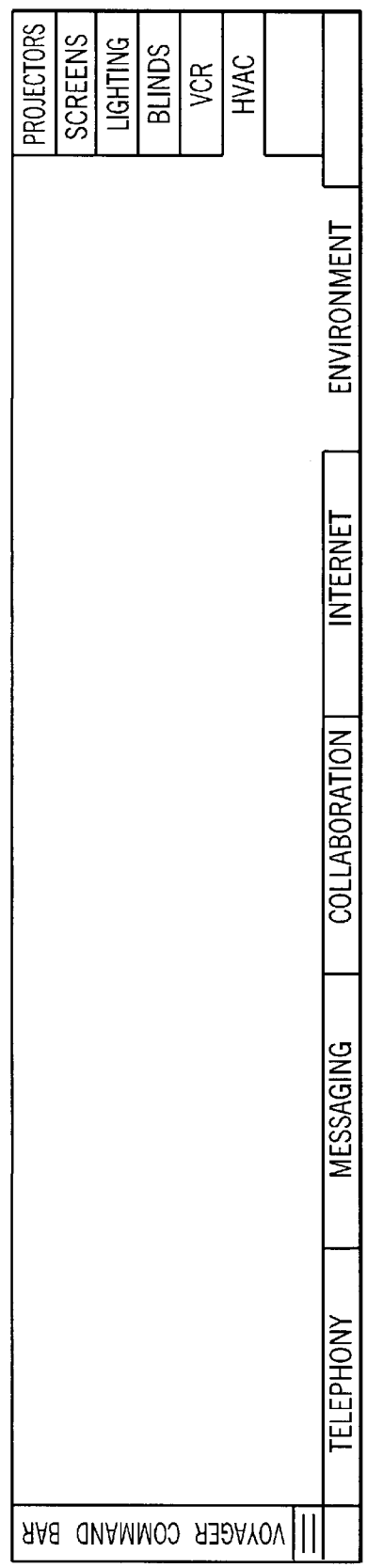

Referring now to FIGS. 4A–T, FIGS. 4A–T are user interface screens for interface with a worker via a portable computing device according to an exemplary embodiment of the present invention which is implemented using a Microsoft Windows 95™ operating system. These screens differ slightly from those available in the embodiment of FIG. 3 and, thus, serve as a second exemplary embodiment of the types of application options available to the worker. Applications accessible to the user may fall under one of five categories: telephony, messaging, collaboration, internet and environment. Each category has associated with it several user interface screens, and each screen has various options to allow the user to engage different applications, according to privileges accorded to and/or preferences selected by the user.

FIG. 4A is a user interface screen for interface with a worker via a portable computing device according to an exemplary embodiment of the present invention including telephony/monitor applications. The screen may include a keypad and various telephony options, e.g. hold, conference call, forward call, etc.

FIG. 4B is a user interface screen for interface with a worker via a portable computing device according to an exemplary embodiment of the present invention including telephony/speed dial applications. The screen may include icons and/or text indicating selected numbers most frequently called.

FIG. 4C is a user interface screen for interface with a worker via a portable computing device according to an exemplary embodiment of the present invention including messaging/voice applications. The screen may include voice message playback controls such as rewind and save, and a voice message listing.

FIG. 4D is a user interface screen for interface with a worker via a portable computing device according to an exemplary embodiment of the present invention including messaging/e-mail applications. The screen may include folders for organizing e-mails and an e-mail message listing.

FIG. 4E is a user interface screen for interface with a worker via a portable computing device according to an exemplary embodiment of the present invention including messaging/paging applications. The screen may include pager tools, such as "send", and a pager message listing.

FIG. 4F is a user interface screen for interface with a worker via a portable computing device according to an exemplary embodiment of the present invention including collaboration/connection applications. The screen may include a conference room listing or other users connected to the system.

FIG. 4G is a user interface screen for interface with a worker via a portable computing device according to an exemplary embodiment of the present invention including collaboration and sharing applications. The screen may include a list of file folders and/or files available to one or more users.

FIG. 4H is a user interface screen for interface with a worker via a portable computing device according to an exemplary embodiment of the present invention including collaboration/video applications. The screen may include a screen identifying the video clip and a video viewing screen; control over the video image (e.g. zooming, resolution, etc.) may be provided.

FIG. 4I is a user interface screen for interface with a worker via a portable computing device according to an exemplary embodiment of the present invention including collaboration/file sharing in the manner of file transfer capability, enabling the user to send or receive files to other users and/or locations.

FIG. 4J is a user interface screen for interface with a worker via a portable computing device according to an exemplary embodiment of the present invention including collaboration/chat applications. The screen may include a screen identifying the parties involved in the chat and a text box for displaying chat messages.

FIG. 4K is a user interface screen for interface with a worker via a portable computing device according to an exemplary embodiment of the present invention including collaboration/whiteboard applications. The screen may include various controls for a whiteboard such as "Next Page" and "Record" and a whiteboard.

FIG. 4L is a user interface screen for interface with a worker via a portable computing device according to an exemplary embodiment of the present invention including internet/favorite sites applications. The screen may include a selection of internet interface applications and a list of favorite sites for each application.

FIG. 4M is a user interface screen for interface with a worker via a portable computing device according to an exemplary embodiment of the present invention including internet/history applications. The screen may include a display documenting the history of sites visited or related information.

FIG. 4N is a user interface screen for interface with a worker via a portable computing device according to an exemplary embodiment of the present invention including internet/newsgroup applications. The screen may include a listing of newsgroups, if any, selected by or for the user as well as particular articles or threads within the newsgroup.

FIG. 4O is a user interface screen for interface with a worker via a portable computing device according to an exemplary embodiment of the present invention including environment/projectors applications. The screen may include various settings for audio and video projections.

FIG. 4P is a user interface screen for interface with a worker via a portable computing device according to an exemplary embodiment of the present invention including environment/screens applications. The screen may include controls for one or more viewing screens at the location.

FIG. 4Q is a user interface screen for interface with a worker via a portable computing device according to an exemplary embodiment of the present invention including environment/lighting applications. The screen may include controls for one or more lighting sources at the location.

FIG. 4R is a user interface screen for interface with a worker via a portable computing device according to an exemplary embodiment of the present invention including environment/blinds applications. The screen may include controls for one or more sets of window blinds or shades.

FIG. 4S is a user interface screen for interface with a worker via a portable computing device according to an exemplary embodiment of the present invention including environment/VCR applications. The screen may include a variety of controls for one or more video cassette recorders (VCR).

FIG. 4T is a user interface screen for interface with a worker via a portable computing device according to an exemplary embodiment of the present invention including environment/HVAC applications. The screen may include controls for a variety of heating, ventilating, and air conditioning operations.

Figure 4U:
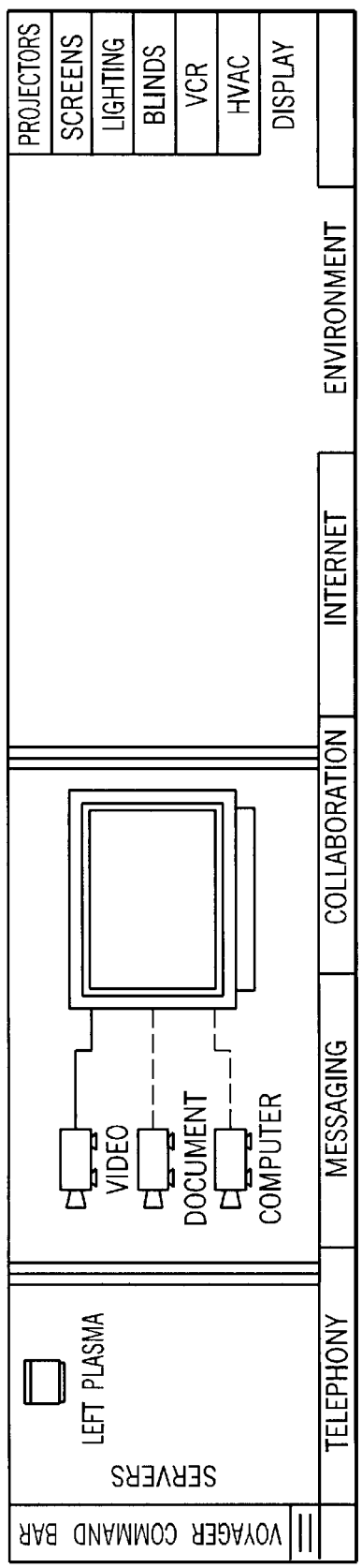

FIG. 4U is a user interface screen for interface with a worker via a portable computing device according to an exemplary embodiment of the present invention including environment/display applications. The screen may include controls for one or more displays, including selectable switching for the display input from various sources (e.g. video input, document camera, computer monitor input).

Figure 4V:
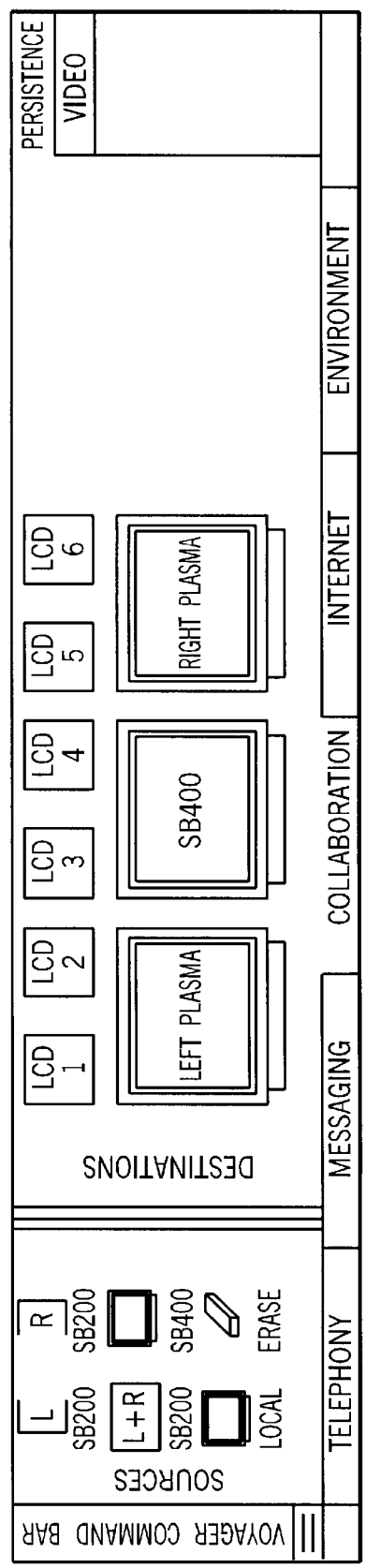

FIG. 4V is a user interface screen for interface with a worker via a portable computing device according to an exemplary embodiment of the present invention including collaboration/persistence applications. The user input screen may include controls for a variety of display output devices (e.g. video destinations) as may be present in the graphics display system in a work space and associated video input devices (e.g. video sources). As shown, the work space includes six LCD displays, two plasma displays and a backlit "softboard" (e.g. recordable whiteboard) display, each of which may be visible to one or more persons present in the work space, to hold video display information. Video input devices may include one or more "softboards" (e.g. recordable whiteboards), or local input from the computing device. The display of video input on each of the video output devices may be controlled by a "drag and drop" type of graphical user interface (which also provides for erasing of each video output device).

Figure 4W:
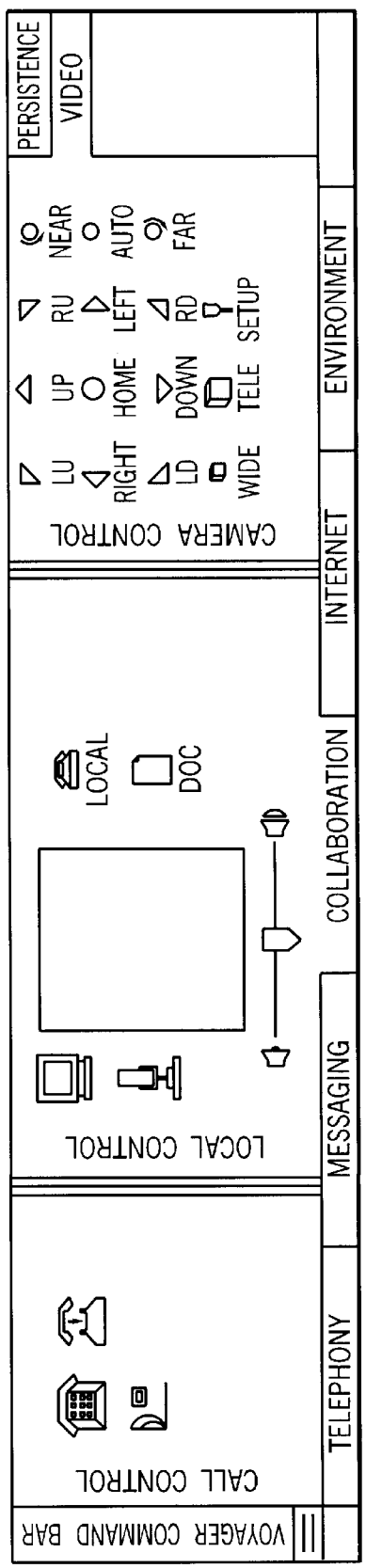

FIG. 4W is a user interface screen for interface with a worker via a portable computing device according to an exemplary embodiment of the present invention including collaboration/video applications. The screen may include controls for a video display (e.g. video conferencing), including screen adjustments, channel selection, input selection, and audio control.

Figure 4X:
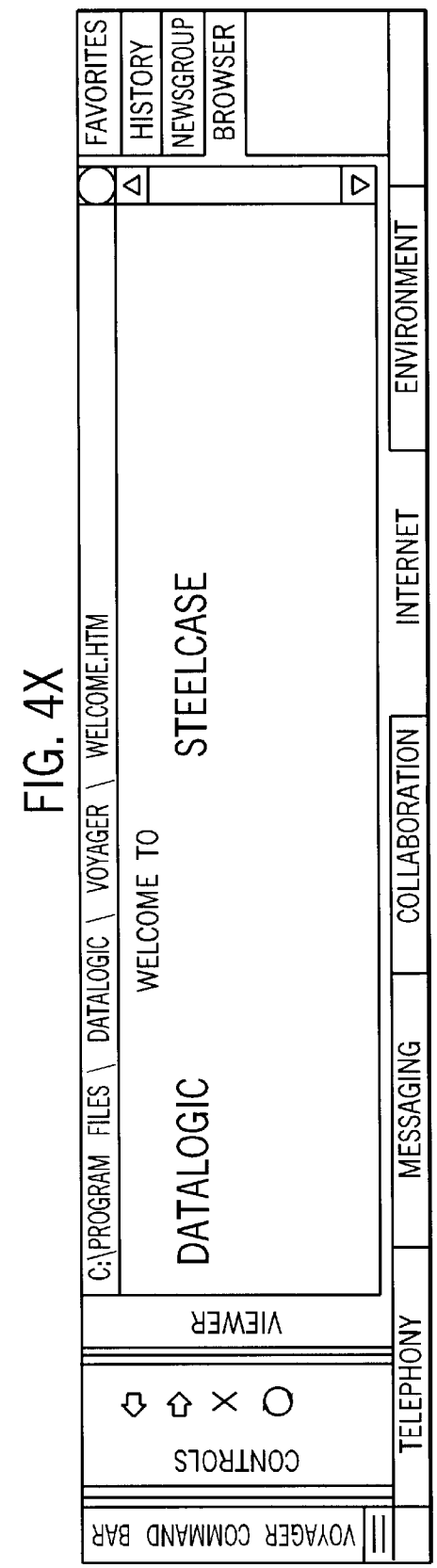

FIG. 4X is a user interface screen for interface with a worker via a portable computing device according to an exemplary embodiment of the present invention including internet/browser applications. The screen may allow the selection and viewing of an internet web site and/or other similar document format (e.g. HTML). The user interface may allow for user commands similar to any typical "web browser" (such as Netscape Navigator version 4.04 or Microsoft Internet Explorer version 4.0), as related to loading and viewing web pages or similar documents.

As will be apparent to those of skill in the art who review this disclosure, according to alternative embodiments, a wide variety of other applications are possible according to various alternative embodiments. Moreover, other user interface screens can be provided suitable for each application so that a worker is given capability and/or control over the application. As a result, access to and/or control of a wide variety of systems, devices, equipment and appliances is available to a user through the command bar at the user interface screen.

According to a particularly preferred embodiment, the user interface screens (i.e. within the "command bar") are dynamically reconfigurable according to the actual privileges and specific preferences of the worker, as well as the presence of "intelligent appliances" corresponding to the IPS and to the user's specific location. For example, each user interface screen will only display the capability, information and/or controls that the worker is entitled to have (or will only appear if the user is entitled to the capability) based on the association provided through the IPS/NPA.

Although the foregoing description has been provided for the presently preferred embodiment of the invention, the invention is not intended to be limited to any particular arrangement, but is defined by the appended claims. These and other alternative configurations of the invention, that may occur to those skilled in the art, are intended to form a part of the invention to the extent such alternatives fall within the scope of the appended claims.

What is claimed is:

1. A method of supporting a worker using a computing device in a distributed work environment, the distributed work environment including a plurality of physical locations and a plurality of network access stations associated with the plurality of physical locations, the network access stations being in communication with a network such that the computing device is connectable to the network via one of the network access stations, the method comprising:

establishing a network connection between the computing device and the network via one of the plurality of network access stations;

communicating to the network a unique station identifier associated with the network access station;

determining the physical location of the worker associated with the computing device based on the unique station identifier; and providing the worker associated with the computing device with privileges associated with the physical location.

2. The method as recited in claim 1, further comprising communicating to the network a unique device identifier associated with the computing device, wherein the provided privileges are further based on the unique device identifier.

3. The method as recited in claim 2, wherein the unique device identifier includes data representative of an identity of the worker associated with the computing device, and the provided privileges are further based on the identity.

4. The method as recited in claim 1, further comprising:

determining an identity of the worker associated with the computing device; and providing the worker with privileges associated with the identity.

5. The method as recited in claim 1, wherein providing the worker with privileges associated with the physical location includes providing the worker with telephony services at the physical location.

6. The method as recited in claim 4, wherein providing the worker with privileges associated with the identity of the worker includes providing the worker with privileges according to preferences indicated by the worker.

7. The method as recited in claim 4, wherein providing the worker with privileges associated with the identity of the worker includes associating the worker with telephony services according to preferences indicated by the worker.

8. The method as recited in claim 7, wherein providing the worker with privileges associated with the physical location includes associating the worker with telephony services at the physical location.

9. The method as recited in claim 1, wherein providing the worker with privileges associated with the physical location includes enabling network services including access to network devices within the distributed work environment.

10. The method as recited in claim 1, further comprising modifying privileges and/or preferences associated with the identity of the worker.

11. The method as recited in claim 1, wherein establishing the network connection includes establishing an infrared data link between the computing device and the network access station.

12. The method as recited in claim 1 wherein at least one connection between the computing device and the network is a wireless connection.

13. The method as recited in claim 12 wherein the wireless connection is an infrared connection.

14. A method of providing a worker using a computing device with privileges and services associated with a physical location in a distributed work environment, the physical location having a network access station associated therewith to provide a network connection between the computing device and a network, the method comprising:

establishing a network connection between the computing device and the network;
   providing to the network a unique device identifier associated with the computing device and a unique station identifier associated with the network access station;
   searching a database to determine whether the unique device identifier is registered in the database;
   if the unique device identifier is registered, associating the computing device with the unique station identifier;
   if the unique device identifier is not registered, registering the unique device identifier and associating the computing device with the unique station identifier; and
   providing the worker with privileges and services available over the network and/or other systems based on the association between the unique device identifier and the unique station identifier.

15. The method as recited in claim 14, wherein the unique device identifier includes data representative of an identity of the worker associated with the computing device and the provided privileges and services are further based on the identity.

16. The method as recited in claim 15, wherein the provided privileges and services are provided in accordance with preferences associated with the identity of the worker.

17. The method as recited in claim 16, wherein the preferences include environmental system settings.

18. The method as recited in claim 14, wherein providing the worker with privileges and services includes routing telephone calls intended for the worker to a selected telephone set and/or directly to the computing device.

19. The method as recited in claim 14, wherein providing the worker with privileges and services includes enabling the worker to control environmental systems including lighting, HVAC and appliance settings associated with the physical location.

20. The method as recited in claim 14 wherein the network connection is a wireless connection.

21. The method as recited in claim 20 wherein the wireless connection is an infrared connection.

22. A data communications system for supporting a worker using a computing device in a distributed work environment with a plurality of physical locations having a plurality of network access stations connected to a network so that the computing device is connectable to the network at a network access station associated with a physical location within the work environment which comprises:

means for providing to the network a network physical address associated with the network access station;
   means for determining an identity of the worker associated with the computing device;
   means for determining the physical location of the worker associated with the computing device;
   means for providing the worker associated with the computing device with privileges and services associated with the physical location; and
   means for providing the worker associated with the computing device with privileges and services associated with the identity of the worker.

23. The data communications system as recited in claim 22, further comprising means for modifying the privileges and services associated with the physical location of the network physical address.

24. The data communications system as recited in claim 22, further comprising means for modifying the privileges and services associated with the identity of the worker.

25. The data communications system as recited in claim 22, further comprising a re-configurable database for maintaining the privileges and services associated with the physical location and the privileges and services associated with the identity of the worker.

26. The data communications system as recited in claim 22 wherein the computing device is connectable to the network by wireless data communications.

27. The data communications system as recited in claim 26 wherein the wireless data communications include infrared data communications.

28. In a data communications system for supporting a worker using a computing device in a distributed work environment having a plurality of physical locations having a plurality of network access stations connected to a network so that the computing device is connectable to the network at a network access station associated with a physical location within the work environment, an improvement comprising each network access station having a unique network physical address associated with a physical location within the work environment so that, when the computing device is connected to the network, the network physical address is provided to a network database and the worker is provided access to privileges and services associated with the physical location.

29. In the data communications system of claim 28, the improvement further comprising an article of furniture, wherein at least a portion of the network access station is attached to the article of furniture.

30. In the data communications system of claim 28, the improvement further comprising the computing device having a port and the network access station having a transceiver so that a data link that is established between the port of the computing device and the transceiver of the network access station.

31. In the data communications system of claim 28, the improvement further comprising the network database including a registry of services available at the physical location associated with the network access station and of preferences associated with the worker.

32. The data communications system as recited in claim 28 wherein the computing device is connectable to the network by a wireless connection.

33. The data communications system as recited in claim 32 wherein the wireless network connection includes an infrared connection.

34. An infrared communications system for supporting a worker having an identity at a computing device in a distributed work environment with a plurality of physical locations having a plurality of network access stations connected over an infrared data link to a network so that the computing device is connectable to the network at a network access station associated with a physical location within the work environment, which comprises:

a location/association system coupled to the network and configured to initiate an association process when the computing device is connected to the network at a network access station and to establish privileges and services for the worker upon completion of the association process;

a physical location database managed by the location/association system and provided with available services associated with the physical location of each network access station according to a unique network physical address associated with the network access station;

a worker preference database managed by the location/association system and provided with privileges and preferences associated with the identity of worker;

so that when the computing device of the worker is connected to the network at the network access station at the physical location the worker is provided with privileges and services according to the physical location and/or the identity of the worker and with preferences according to the identity of the worker.

35. The infrared data communications system as recited in claim 34, Wherein at least one of the plurality of network access stations is associated with an article of furniture.

36. The infrared data communications system as recited in claim 35, wherein the article of furniture provides a worksurface and the computing device is a portable computer placed on the worksurface.

37. The infrared data communications system as recited in claim 34, wherein the available privileges and services at the physical location include telephony services and access to network devices.

38. The infrared data communications system as recited in claim 34, wherein the available privileges and services at the physical location include environmental control including lighting, HVAC and appliance settings.

39. The infrared data communication system as recited in claim 34, wherein the privileges and services of the worker include telephony and network computing privileges and services.

40. The infrared data communications system as recited in claim 39, wherein the telephony privileges and services include the routing of telephone calls to the nearest telephone set and/or directly to the computing device.

41. The infrared data communications system as recited in claim 39, wherein the network computing privileges and services include electronic mail, peripheral connections, application programs and database access through the computing device.

42. The infrared data communications system as recited in claim 34, wherein each of the plurality of network access stations is configured to be installed within an article of furniture.

43. The infrared data communications systems as recited in claim 34, further comprising a reconfigurable database for maintaining the privileges and services associated with the physical location and the privileges and services associated with the identity of the worker.

* * * * *